US012625384B2

(12) United States Patent
Piskunov et al.

(10) Patent No.: US 12,625,384 B2
(45) Date of Patent: May 12, 2026

(54) OPTICAL DEVICE, DISPLAY APPARATUS INCLUDING SAME, AND METHOD FOR EXTENDING LENGTH OF OPTICAL PATH

(71) Applicant: Samsung Electronics Co., Ltd., Suwon-si (KR)

(72) Inventors: Dmitriy Evgenyevich Piskunov, Moscow region (RU); Svetlana Vladimirovna Danilova, Moscow region (RU); Nikolay Victorovich Muravev, Moscow region (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 878 days.

(21) Appl. No.: 17/826,913

(22) Filed: May 27, 2022

(65) Prior Publication Data

US 2022/0291517 A1 Sep. 15, 2022

Related U.S. Application Data

(63) Continuation of application No. PCT/KR2020/017190, filed on Nov. 27, 2020.

(30) Foreign Application Priority Data

Nov. 28, 2019 (RU) .......................... RU2019138594
Mar. 24, 2020 (KR) ........................ 10-2020-0035813

(51) Int. Cl.
G02B 27/28 (2006.01)
G02B 27/01 (2006.01)
G02F 1/01 (2006.01)

(52) U.S. Cl.
CPC ......... *G02B 27/28* (2013.01); *G02B 27/0101* (2013.01); *G02F 1/0102* (2013.01); *G02B 2207/117* (2013.01)

(58) Field of Classification Search
CPC ................ G02B 27/28; G02B 27/0101; G02B 2207/117; G02F 1/0102
(Continued)

(56) References Cited

U.S. PATENT DOCUMENTS 3,443,858 A 5/1969 La Russa
5,853,240 A 12/1998 Tanaka et al.
(Continued)

FOREIGN PATENT DOCUMENTS

CN 105900000 A 8/2016
EP 0 435 296 A1 7/1991
(Continued)

OTHER PUBLICATIONS

Korean Office Action dated Nov. 14, 2024, issued in Korean Patent Application No. 10-2020-0035813.
(Continued)

*Primary Examiner* — Bumsuk Won
*Assistant Examiner* — Grant A Gagnon
(74) *Attorney, Agent, or Firm* — Jefferson IP Law, LLP

(57) ABSTRACT

An optical device is provided. The optical device includes a display apparatus including the same, and a method of extending an optical path. The optical device includes at least one electroactive optical cell configured to adjust a phase profile of light, and an optical path extender to extend an optical path by allowing light to transmit through the at least one electroactive optical cell in opposite directions a plurality of times.

16 Claims, 20 Drawing Sheets

(58) Field of Classification Search
USPC ........................................................ 248/279
See application file for complete search history.

(56) References Cited

U.S. PATENT DOCUMENTS

| | | |
|---|---|---|
| 6,587,180 B2 | 7/2003 | Wang et al. |
| 6,795,182 B2 | 9/2004 | Rakuljic et al. |
| 8,390,749 B2 | 3/2013 | Chen et al. |
| 9,977,251 B2 | 5/2018 | Cho et al. |
| 10,197,810 B2 | 2/2019 | Seo et al. |
| 2002/0145042 A1 | 10/2002 | Knowles et al. |
| 2003/0011769 A1 | 1/2003 | Rakuljic et al. |
| 2003/0019931 A1 | 1/2003 | Tsikos et al. |
| 2003/0019932 A1 | 1/2003 | Tsikos et al. |
| 2003/0019933 A1 | 1/2003 | Tsikos et al. |
| 2003/0034387 A1 | 2/2003 | Knowles et al. |
| 2003/0034395 A1 | 2/2003 | Tsikos et al. |
| 2003/0034396 A1 | 2/2003 | Tsikos et al. |
| 2003/0035460 A1 | 2/2003 | Tsikos et al. |
| 2003/0035461 A1 | 2/2003 | Tsikos et al. |
| 2003/0042309 A1 | 3/2003 | Tsikos et al. |
| 2003/0042314 A1 | 3/2003 | Tsikos et al. |
| 2003/0042315 A1 | 3/2003 | Tsikos et al. |
| 2003/0062415 A1 | 4/2003 | Tsikos et al. |
| 2003/0071122 A1 | 4/2003 | Tsikos et al. |
| 2003/0071123 A1 | 4/2003 | Tsikos et al. |
| 2003/0071128 A1 | 4/2003 | Tsikos et al. |
| 2003/0085280 A1 | 5/2003 | Tsikos et al. |
| 2003/0098349 A1 | 5/2003 | Tsikos et al. |
| 2003/0148542 A1 | 8/2003 | Pawlak et al. |
| 2006/0086794 A1 | 4/2006 | Knowles et al. |
| 2008/0013051 A1 | 1/2008 | Glinski et al. |
| 2013/0021545 A1 | 1/2013 | Song et al. |
| 2014/0049661 A1 | 2/2014 | Leung et al. |
| 2016/0077338 A1 | 3/2016 | Robbins et al. |
| 2016/0320684 A1 | 11/2016 | Galstian |
| 2018/0284464 A1 | 10/2018 | Lu et al. |
| 2019/0025602 A1 | 1/2019 | Qin et al. |
| 2020/0142254 A1 | 5/2020 | Ryu et al. |
| 2020/0192126 A1 | 6/2020 | Yun et al. |
| 2020/0393709 A1 | 12/2020 | Oh |

FOREIGN PATENT DOCUMENTS

| | | | |
|---|---|---|---|
| KR | 10-2009-0046778 A | 5/2009 | |
| KR | 10-2018-0125377 A | 11/2018 | |
| KR | 10-2019-0073425 A | 6/2019 | |
| KR | 10-2019-0116448 A | 10/2019 | |
| WO | 2002/043195 A2 | 5/2002 | |
| WO | 2003/005621 A1 | 1/2003 | |
| WO | 2004/074923 A1 | 9/2004 | |
| WO | 2008/020899 A2 | 2/2008 | |
| WO | 2015/103709 A1 | 7/2015 | |
| WO | 2017/216716 A1 | 12/2017 | |
| WO | 2019/055753 A1 | 3/2019 | |

OTHER PUBLICATIONS

International Search Report dated Mar. 4, 2021, issued in International Application No. PCT/KR2020/017190.

Russian Decision on Grant dated Jul. 22, 2020, issued in Russian Application No. 2019138594.

Russian Search Report dated Apr. 7, 2020, issued in Russian Application No. 2019138594.

NUMBER OF FIRST ELECTRODES

Input

610

612

614

616

618

RHCP

LHCP

RHCP

LHCP

RHCP

LHCP

LHCP

OL1

LHCP

RHCP

OL2

PIXELS OF FIRST FRAME          PIXELS OF SECOND FRAME

OPTICAL DEVICE, DISPLAY APPARATUS INCLUDING SAME, AND METHOD FOR EXTENDING LENGTH OF OPTICAL PATH

CROSS-REFERENCE TO RELATED APPLICATION(S)

This application is a continuation application, claiming priority under § 365(c), of an International application No. PCT/KR2020/017190, filed on Nov. 27, 2020, which is based on and claims the benefit of a Russian patent application number 2019138594, filed on Nov. 28, 2019, in the Russian Intellectual Property Office, and of a Korea patent application number 10-2020-0035813, filed on Mar. 24, 2020, in the Korean Intellectual Property Office, the disclosure of each of which is incorporated by reference herein in its entirety.

BACKGROUND

1. Field

The disclosure relates to an optical system. More particularly, the disclosure relates to an optical device capable of extending an optical path length (OPL), a display apparatus including the optical device, and a method.

2. Description of Related Art

In augmented reality or virtual reality (AR/VR) systems used for various applications, tunable focus glasses for vision correction, and in particular for compensating for age-related presbyopia, lenses for photo and video cameras, electroactive diffractive lenses, in particular liquid crystal (LC) lenses or polymer gel based lenses are used. To improve such optical systems, focal length adjustment of an optical system for changing visible position of a virtual image as well as frame shifting to increase image resolution are provided.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an optical device capable of extending an optical path length (OPL).

Another aspect of the disclosure is to provide a display apparatus including an optical device capable of extending an OPL.

Another aspect of the disclosure is to provide a method of extending an OPL.

Additional aspects will be set forth in part in the description which follows and, in part, will be apparent from the description, or may be learned by practice of the presented embodiments.

In accordance with an aspect of the disclosure, an optical device is provided. The optical device includes at least one electroactive optical cell configured to adjust a phase profile of light, and an optical path extender to extend a path of light by allowing light to transmit through the at least one electroactive optical cell in opposite directions a plurality of times.

The optical path extender may include at least one of a semi-transparent mirror, a quarter-wave plate (QWP), or a polarization selective element.

The polarization selective element may include at least one of a polarizing beam splitter (PBS), a wire grid polarizer (WGP), a cholesteric crystal, a circular polarization selective mirror, or a geometric phase lens (GPL).

The at least one electroactive optical cell may include a first electrode layer, a second electrode layer facing the first electrode layer, and an electroactive layer between the first electrode layer and the second electrode layer, and wherein the electroactive layer changes the phase profile by a voltage applied to the first electrode layer and the second electrode layer.

The polarization selective element may include a first polarization selective element and a second polarization selective element arranged to intersect each other.

The first polarization selective element may be configured to reflect left-hand circular polarization (LHCP) and transmit right-hand circular polarization (RHCP), and the second polarization selective element is configured to transmit LHCP and reflect RHCP.

The optical path extender may include a semi-transparent mirror disposed in front of the at least one electroactive optical cell, and a QWP, and a PBS disposed behind the at least one electroactive optical cell on the path of light.

The optical path extender may include a PBS disposed in front of the at least one electroactive optical cell, a first QWP, a semi-transparent mirror, a second QWP, and a WGP disposed behind the at least one electroactive optical cell on the path of light.

The optical path extender may be configured to allow light to pass through the at least one electroactive optical cell at least three times.

The at least one electroactive optical cell may include a first electroactive optical cell and a second electroactive optical cell, and wherein the optical path extender comprises a first PBS disposed in front of the first electroactive optical cell, a first QWP disposed between the first electroactive optical cell and the second electroactive optical cell, a semi-transparent mirror, a second QWP, and a WGP disposed behind the second electroactive optical cell on the path of light.

The optical path extender may include a semi-transparent mirror disposed in front of the at least one electroactive optical cell and a circular polarization selective mirror disposed behind the at least one electroactive optical cell on the path of light.

At least one of the semi-transparent mirror and the circular polarization selective mirror may be configured in a curved shape.

In accordance with another aspect of the disclosure, a display apparatus is provided. The display apparatus includes a display panel configured to form an image, and an optical device configured to adjust a phase profile of light emitted from the display panel, wherein the optical device comprises at least one electroactive optical cell and an optical path extender configured to extend a path of light by allowing light to transmit through the at least one electroactive optical cell in opposite directions a plurality of times.

The optical path extender may include at least one of a semi-transparent mirror, a quarter-wave plate (QWP), or a polarization selective element.

The polarization selective element may include at least one of a polarizing beam splitter (PBS), a wire grid polarizer (WGP), a cholesteric crystal, a circular polarization selective mirror, or a geometric phase lens (GPL).

The display apparatus may further include a waveguide configured to transfer the light from the display panel.

In accordance with another aspect of the disclosure, a method, performed by an optical device, of extending an optical path length (OPL) of incident light, is provided. The method includes splitting the incident light into light of a first polarization and light of a second polarization, converting, by a quarter-wave plate (QWP), a polarization of an optical light by using at least one of the first polarization and the second polarization, transmitting the light of the first polarization and the light of the second polarization through an electroactive optical cell, at least partially reflecting, by a polarizing beam splitter (PBS), light of the converted polarization, transmitting the light of the converted polarization through the electroactive optical cell, at least partially reflecting the light by a semi-transparent mirror, and transmitting the light reflected by the semi-transparent mirror through the electroactive optical cell.

The first polarization and the second polarization may be left-hand circular polarization (LHCP) or right-hand circular polarization (RHCP), respectively.

The first polarization and the second polarization may be linear p-polarization or linear s-polarization.

The optical device according to an embodiment of the disclosure may extend an optical path length (OPL) by allowing light to pass through the electroactive optical cell. Thereby, the optical performance may be ensured while the thickness of the electroactive optical cell is reduced, and the reaction rate of the electroactive optical cell may be increased.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 14 schematically shows an optical device according to an embodiment of the disclosure;

Throughout the drawings, it should be noted that like reference numbers are used to depict the same or similar elements, features, and structures.

DETAILED DESCRIPTION

Figure 1:
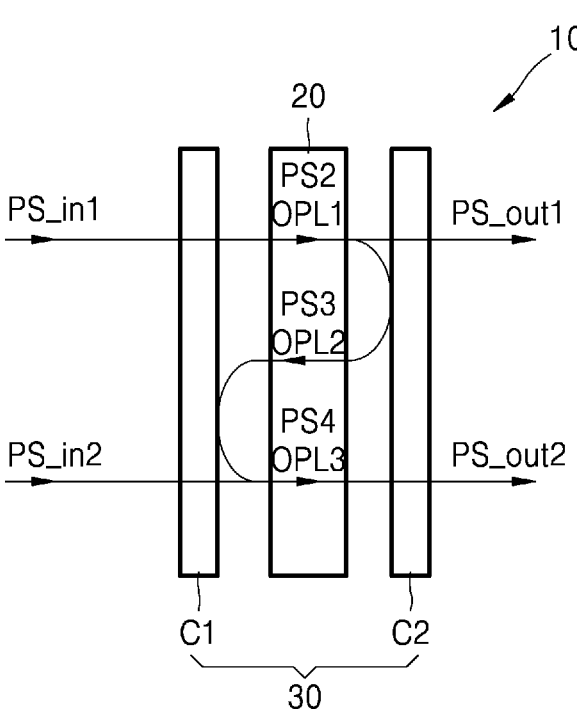
FIG. 1 is a schematic view of an optical device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An optical device, a display apparatus including the same, and a method of extending an optical path according to various embodiment of the disclosure will now be described with reference to the accompanying drawings. Like reference numerals in the drawings denote like elements, and, in the drawings, the sizes of elements may be exaggerated for clarity and for convenience of explanation. While such terms as "first", "second", etc., may be used to describe various components, such components must not be limited to the above terms. The above terms are used only to distinguish one component from another.

An expression used in the singular encompasses the expression of the plural, unless it has a clearly different meaning in the context. The terms "comprises" and/or "comprising" or "includes" and/or "including" when used in this specification, specify the presence of stated elements, but do not preclude the presence or addition of one or more other elements. In the drawings, the sizes or thicknesses of elements may be exaggerated for clarity of explanation. It will be understood that when a material layer is referred to as being "formed on" a substrate or another layer, it may be directly or indirectly formed on the substrate or the other layer. That is, for example, intervening layers may be present. Materials that constitute each layer in embodiments below are exemplary, and thus the other materials may be used.

The terms "unit", "-er (-or)", and "module" when used in this specification refers to a unit in which at least one function or operation is performed, and may be implemented as hardware, software, or a combination of hardware and software.

The particular implementations shown and described herein are illustrative examples of the disclosure and are not intended to otherwise limit the scope of the disclosure in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The operations that constitute a method may be performed in any suitable order unless otherwise indicated herein. The use of any and all language (e.g., "such as") provided herein is intended merely to explain the technical spirit of the disclosure in detail and does not pose a limitation on the scope of the disclosure unless otherwise claimed.

FIG. 1 schematically shows an optical device according to an embodiment of the disclosure.

The optical device 10 includes at least one electroactive optical cell 20 and an optical path extender 30 that allows light to pass through the electroactive optical cell 20 at least two times in opposite directions.

The electroactive optical cell 20 may electrically adjust optical power.

The optical path extender 30 may extend an optical path by allowing the light to pass through the electroactive optical cell 15 at least two times.

Referring to FIG. 1, the optical path extender 30 may include a first element C1 arranged in front of the electroactive optical cell 20 and a second element C2 arranged behind the electroactive optical cell 20 on the optical path.

At least one of the first element C1 and the second element C2 may include at least one of a semi-transparent mirror, a phase delay element, or a polarization selective element. The semi-transparent mirror, the phase delay element, and the polarization selective element may be arranged in various ways in front of and behind the electroactive optical cell 20. These various examples will be described below.

At least one polarization selective element may include any one of a polarizing beam splitter (PBS), a wire grid polarizer, a cholesteric crystal, a circular polarization selective mirror, or a geometric phase lens (GPL).

The first element C1 and the second element C2 may include at least one of, for example, a semi-transparent mirror, a phase delay element (e.g., a quarter-wave plate (QWP) or a half-wave plate (HWP)), a polarization selective mirror for circular polarization (e.g., a cholesteric crystal), a polarizer (e.g., a wire grid polarizer (WGP)), a PBS, or a pixel level polarizer.

The optical path extender 30 may provide for selective transmission, reflection, or blocking (reflection or absorption) of light having a given phase or polarization.

The first element C1 may transmit, for example, incident light PS_in1 having a first polarization state, convert the incident light PS ml into light having a second polarization state PS2, reflect light having a third polarization state PS3, and convert the light into light having a fourth polarization state PS4. In addition, the first element C1 may transmit incident light PS_in2 having a fifth polarization state and convert the incident light PS_in2 into light having the fourth polarization state PS4.

The second element C2 may, for example, partially reflect and partially transmit the light having the second polarization state PS2. The second element C2 may partially convert the light having the second polarization state PS2 into light having the third polarization state PS3 and reflect the light while outputting partial light PS_out1. In addition, the second element C2 may transmit the light having the fourth polarization state PS4 to output light PS_out2.

Reference numerals OPL1, OPL2, OPL3 in FIG. 1 denote segments of a length of the resulting optical path, wherein the total optical path is a sum of lengths of these segments (OPL=OPL1+OPL2+OPL3). The optical path extender 30 may extend an optical path length (OPL) by allowing light to pass through the electroactive optical cell 20 a plurality of times.

Figure 2:
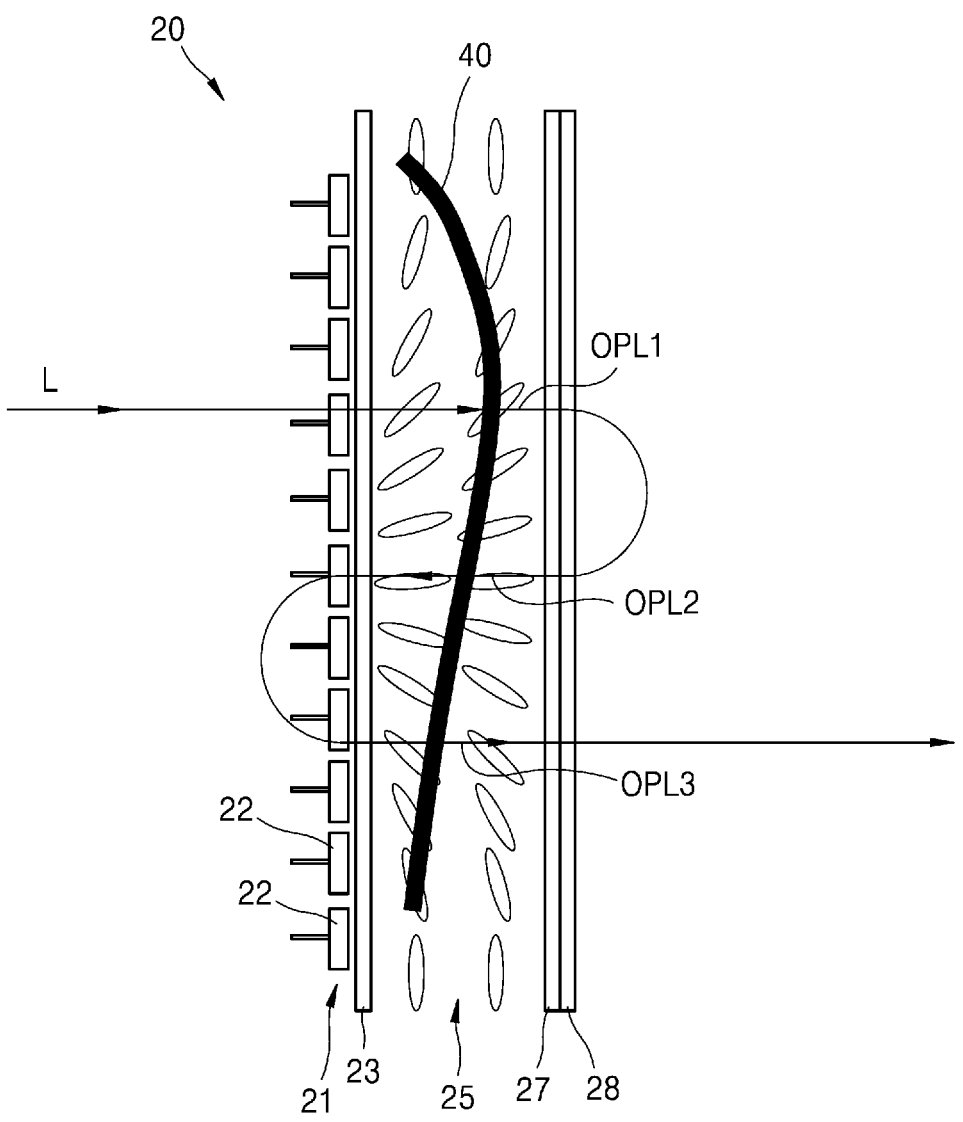
FIG. 2 shows an example of an electroactive optical cell included in the optical device according to an embodiment of the disclosure.

FIG. 2 shows an example of the electroactive optical cell according to an embodiment of the disclosure.

Referring to FIG. 2, the electroactive optical cell 20 may include a first electrode layer 21, a second electrode layer 28 opposite to the first electrode layer 21, and an electroactive layer 25 between the first electrode layer 21 and the second electrode layer 28. The first electrode layer 21 may be provided on a first substrate 23, and the second electrode layer 28 may be provided on a second substrate 27.

The first electrode layer 21 may include a plurality of electrodes 22 arranged to be spaced apart from each other. A voltage may be independently applied to each of the plurality of electrodes 22. The second electrode layer 28 may be a common electrode. A phase profile 40 may be adjusted by selectively applying a voltage to the plurality of electrodes 22 and driving the electroactive layer 25. The optical power or focal length may be adjusted by adjusting the phase profile 40.

FIGS. 3, 4, 5, and 6 show examples of electrode structures of the electroactive optical cell included in the optical device according to various embodiments of the disclosure.

Figure 3:
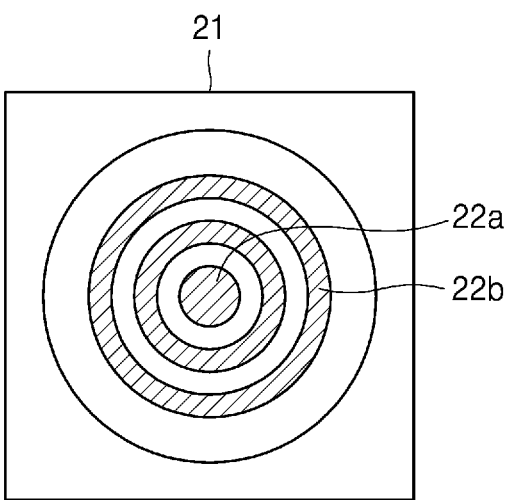
FIGS. 3, 4, 5, and 6 show examples of electrode structures of the electroactive optical cell included in the optical device according to various embodiments of the disclosure.

Referring to FIG. 3, the first electrode layer 21 may include a circular electrode 22a disposed at the center and a concentric ring electrode 22b.

Figure 4:
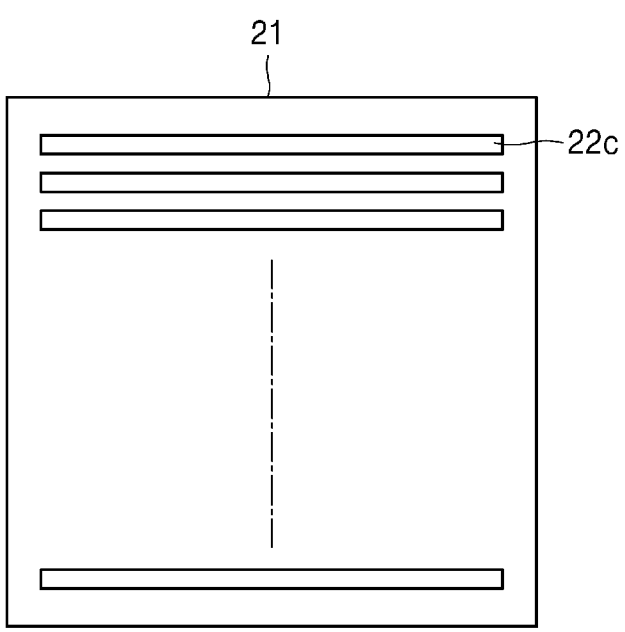
Figure 5:
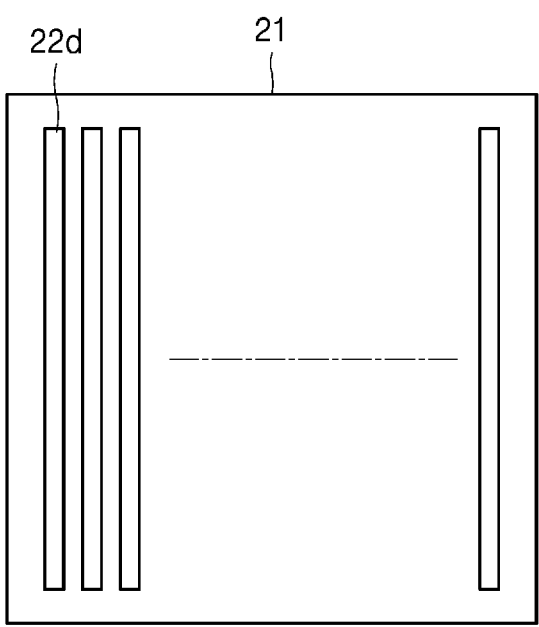

Referring to FIGS. 4 and 5, the first electrode layer 21 may include strip electrodes 22c arranged in parallel in a horizontal direction. Alternatively, referring to Fifth, the first electrode layer 21 may include strip electrodes 22d arranged in parallel in a vertical direction.

Figure 6:
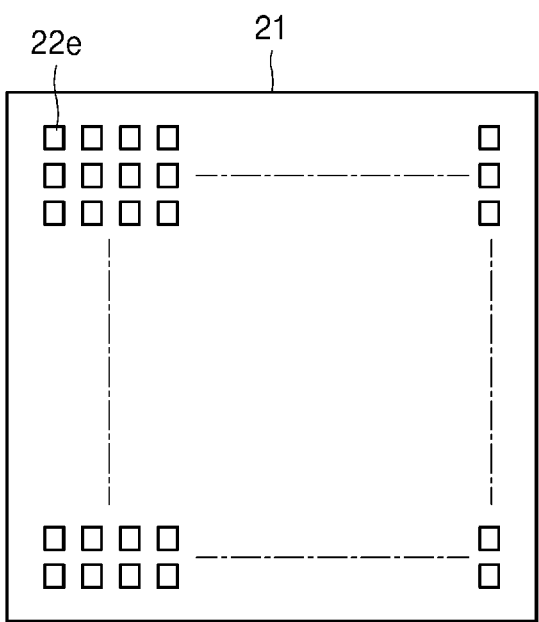

Referring to FIG. 6, the first electrode layer 21 may include a structure in which polygonal electrodes 22e are arranged. However, the first electrode layer 21 is not limited thereto. According to an embodiment of the disclosure, at least one electroactive optical cell may form a polarization-dependent structure or a polarization-independent structure. Also, an electrode pattern of irregular shapes and irregular arrangements may be used.

According to embodiments of the disclosure, one or more electroactive optical cells may have rectangular, circular or any other suitable shape of aperture, depending on a selected shape of the electrode pattern. The shape of aperture of the electroactive optical cell is not limited to circular and rectangular, and may be, in particular, rectangular, polygonal or curved. The shape of aperture of the electroactive optical cell may be arbitrarily selected according to practical requirements of the optical device, size restrictions, required electrode shape, size, and the like.

The first electrode layer 21 and the second electrode layer 28 may include transparent conductive materials well known to those skilled in the art. The first electrode layer 21 and the second electrode layer 28 may include, for example, at least one of indium oxide, tin oxide, indium zinc oxide (IZO), indium tin oxide (ITO), or zinc oxide.

The electroactive optical cell 20 may include the electroactive layer 25 of various types known in the art. The electroactive layer 25 may include a material of which refractive index changes by an applied voltage. The electroactive layer 25 may comprise, for example, a liquid crystal layer or a polymer gel layer. However, the electroactive layer 25 is not limited thereto.

Implementation of the electroactive optical cell 20 is not limited by the above-mentioned kind of electroactive layer. Effect (polarization) of electrodes on the orientation of crystals of the electroactive layer 25 is as follows. Voltage applied to the first electrode layer 21 and the second electrode layer 28 changes the orientation of the crystals of the electroactive layer 25, by means of which refractive index changes.

Because the first electrode layer 21 and the second electrode layer 28 may be arranged over the entire surface of the electroactive optical cell 20, and a specific voltage is applied to each electrode, a voltage profile is thus generated, and a transition from the voltage profile to a phase profile may be realized by using phase-voltage dependence which is characteristic of each material of the electroactive layers 25. For more detail, see Chen R. H. Liquid crystal displays: fundamental physics and technology.—John Wiley & Sons, 2011, Den Boer W.

The voltage applied to the electrodes may change the phase profile by the electroactive layer 25 and change the optical power of the electroactive optical cell 20. A phase delay $\varphi$ applied by the electroactive optical cell 20 may be proportional to an OPL as shown in the following Equation. The phase delay $\varphi$ may indicate an amount of change in the phase profile. The longer the OPL, the better the optical performance, such as the optical power of the electroactive optical cell 20.

$$\varphi = k \cdot OPL, \tag{Equation 1}$$

where, k is a wave number equal to $(2\pi/\lambda)$, and $\lambda$ is a wavelength of light. In addition, the OPL may be expressed as follows.

$$OPL = n \cdot t, \tag{Equation 2}$$

where, n is a refractive index of the electroactive material of the electroactive layer 25 and t is a thickness of the electroactive layer 25.

A change in the voltage applied to each electrode of the electrode layer causes a change in the phase profile of the electroactive layer 25. When an optical ray passes through the same electroactive optical cell N times, a phase retardation value is increased by N times, respectively. A response time $\tau$ of the electroactive layer 25 is proportional to a square of the thickness t of the electroactive layer 25 as shown in the following Equation.

$$\tau \sim t^2 \tag{Equation 3}$$

Therefore, referring to Equations 1, 2, and 3, when an optical ray passes through the same electroactive optical cell N times, the thickness t of the electroactive layer 25 for the same OPL may be reduced (1/N) times, and the response time of the electroactive optical cell may be reduced by $1/N^2$ times.

A smaller thickness of the electroactive layer 25 reduces the response time, but a shorter OPL may degrade the optical performance of the electroactive optical cell. In consideration of this, both the response time and optical performance of the electroactive optical cell may be improved by increasing the OPL while reducing the thickness of the electroactive layer 25.

Referring to FIG. 2, light L may pass through the electroactive optical cell 20 three times. The optical path when the light L passes through the electroactive optical cell 20 first time is referred to as OPL1, the optical path when the light L passes through the electroactive optical cell 20 second time is referred to as OPL2, and the optical path when the light L passes through the electroactive optical cell 20 third time is referred to as OPL3.

Figure 7:
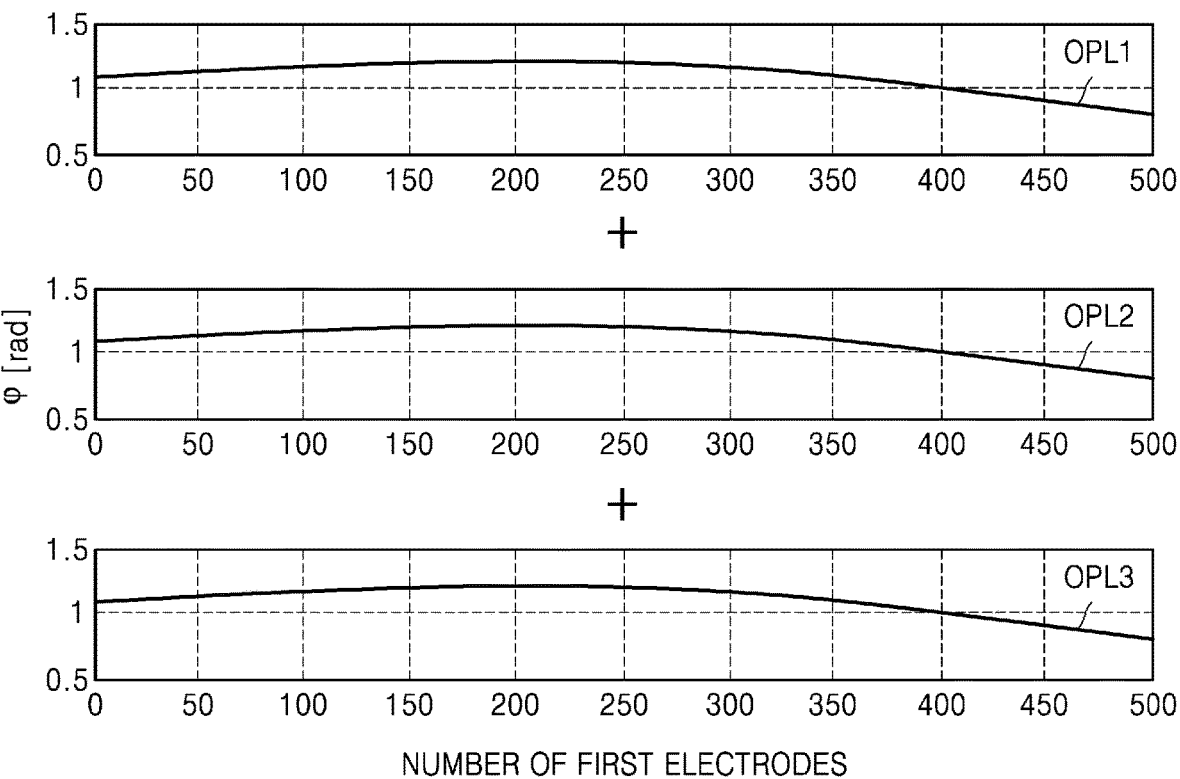
FIG. 7 shows phase profiles of respective optical paths with respect to the number of first electrodes of the electroactive optical cell included in the optical device according to an embodiment of the disclosure.

FIG. 7 shows phase profiles of the first optical path OPL1, the second optical path OPL2, and the third optical path OPL3, respectively, with respect to the number of first electrodes according to an embodiment of the disclosure.

Referring to FIG. 7, the vertical axis of a graph represents the phase delay (p.

Figure 8:
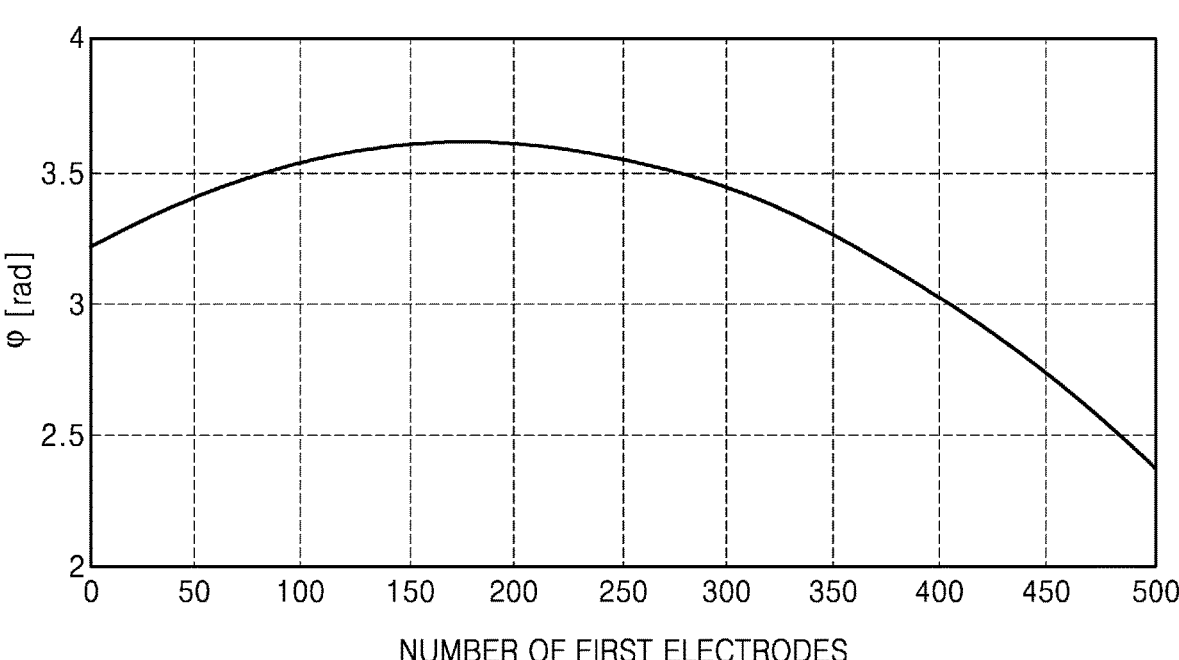
FIG. 8 shows a combination of the phase profiles shown in FIG. 7 according to an embodiment of the disclosure.

FIG. 8 shows the overall phase profile when light passes through the same electroactive optical cell three times according to an embodiment of the disclosure.

Referring to FIG. 8, when light passes through the same electroactive optical cell three times, the phase profile may be implemented by summing phase profiles of the first optical path OPL1, the second optical path OPL2, and the third optical path OPL3. Because an amount of change of the overall phase profile is large, the optical performance of the electroactive optical cell may be increased by broadening a range of tunable optical power. Therefore, with respect to electroactive optical cells of the same thickness, the OPL is increased by allowing light to pass through the electroactive optical cells a plurality of times in opposite directions, and thus the response time of the electroactive optical cell may be reduced, and the optical performance thereof may be improved.

In the optical device 10 according to an embodiment of the disclosure, the optical path extender 30 may increase the OPL while maintaining the same thickness by allowing light to pass through the electroactive optical cell 20 a plurality of times in opposite directions.

Referring to FIG. 1, light passes through the electroactive optical cell 20 three times, and the OPL may extend to (OPL1+OPL2+OPL3). In addition, the optical device 10 according to an embodiment of the disclosure may provide a plurality of channels by splitting incident light into a plurality of lights having different phase characteristics and/or polarization states. And, it may provide different optical powers and/or different focal plane positions.

It should be understood that, depending on a given embodiment of the disclosure, the number of the above-mentioned specific elements of the selective polarization structure and their positions in the optical path may vary.

Figure 9:
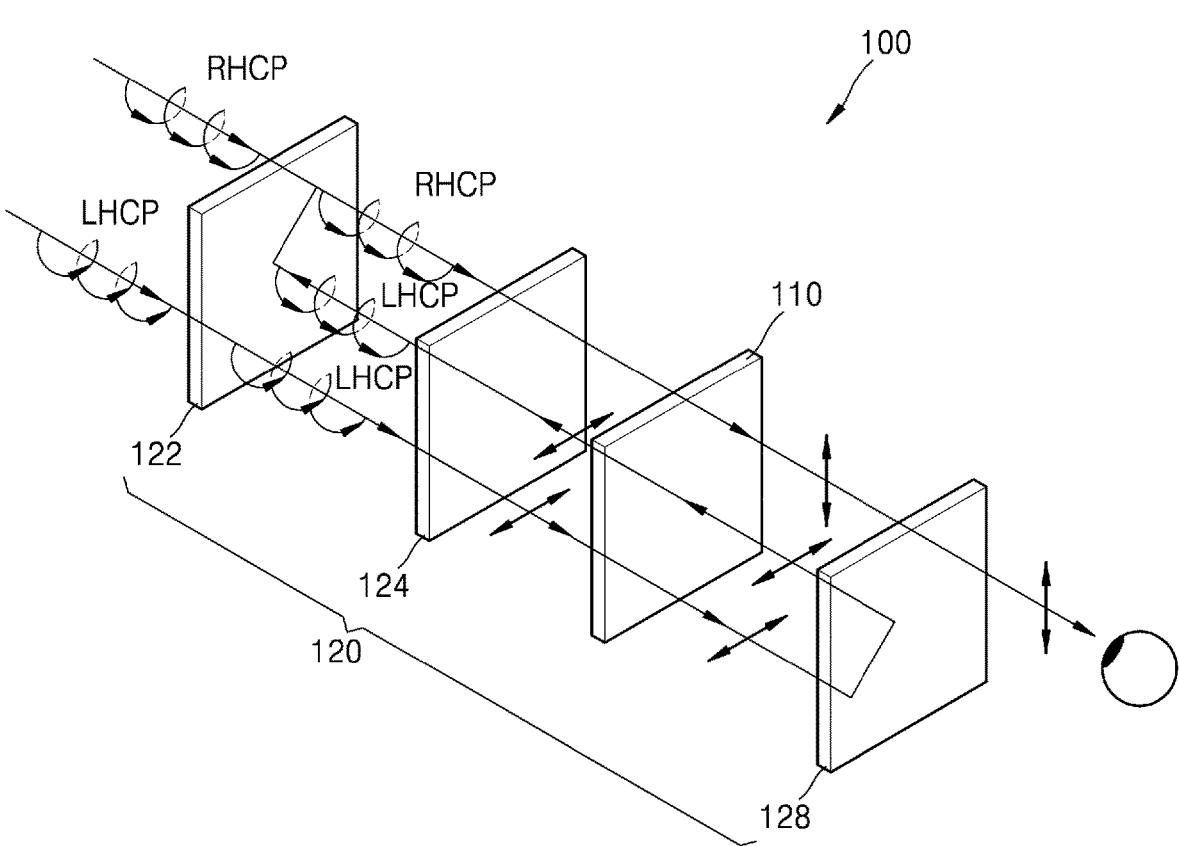
FIG. 9 schematically shows an optical device according to an embodiment of the disclosure.

FIG. 9 illustrates an optical device according to an embodiment of the disclosure.

Referring to FIG. 9, tan optical device 100 according to an embodiment of the disclosure may include an electroactive optical cell 110 and an optical path extender 120 configured to allow light to repeatedly pass through the electroactive optical cell 110 in opposite directions.

The optical path extender 120 may include at least one semi-transparent mirror 122, at least one QWP 124, and at least one PBS 128.

The at least one semi-transparent mirrors 122 and the at least one QWP 124 may be disposed in an optical path in front of the electroactive optical cell 110. The PBS 128 may be disposed in an optical path behind the electroactive optical cell 110.

To improve image quality, there is a need for extending an OPL of light that forms an image in the optical device 100. An optical device, such as a spatial light modulator (SLM), may provide a phase delay with respect to an incident optical light to adjust the OPL of the optical light. By adjusting the OPL of the optical light, the performance of the SLM may be improved, such as the maximum optical power, the diffraction angle of the optical light, and the aperture diameter of the SLM. Birefringence equal to a difference between a refractive index for a non-ordinary beam and a refractive index for an ordinary beam may not be changed with respect to an electroactive material of an optical cell because it is determined by characteristics of the material used. In order to extend the OPL, it is possible to increase the thickness of the SLM. For example, the thickness of the electroactive optical cell may be increased, but this may entail longer response time and/or higher voltage on electrodes needed for tuning the electroactive optical cell.

In this case, when the optical device is applied to an augmented reality (AR) system or a virtual reality (VR) system, there may be a problem of vergence-accommodation conflict (VAC), which causes user eye fatigue and may cause different uncomfortable feelings to a user, such as e.g. headache and nausea. Most existing AR headsets or VR headsets have a fixed focal length and may not move the virtual image beyond the focal length. The reason is that eye vergence and distance at which the user's eyes focus and the convergence of the eyes do not lie in the same plane during a focal length adjustment process.

For example, when viewing a real object located at different distances through an AR device with a virtual object at a fixed focal length, only one of the virtual object or the real object may be in the focal plane, and the virtual object and the real object may not be simultaneously in focus. In case of a VR system, a VAC conflict occurs when the focal plane (eye accommodation at a display) does not correspond to relative size of an object (vergence of optical axes of the eye at the object).

In addition, an important problem when the optical device is used in AR/VR systems is a need for correcting refractive errors of user's eyes for users whose vision deviates from the norm due to vision disorders such as presbyopia, myopia, and hyperopia. At present, because most AR/VR systems have a fixed focal length, it is not possible to correct refractive errors of users' vision by means of the AR/VR systems per se, and thus such vision correction means as contact lenses or eye glasses is used. This makes using the AR/VR systems inconvenient, degrades system performance and user experience or increases the size of the optical system.

In addition, known AR/VR systems, particularly virtual reality systems, have a drawback of limited resolution of a virtual image displayed to a user. Most user devices, in particular, displays of smart phones, tablets, desktop monitors, television sets, and the like, which the user views at a small angle of view and thus have enough resolution to provide a user with a high quality image. In contrast, the virtual reality system displays the image to the user at a large angle of view, and thus the image resolution is relatively lower. For example, resolution of images displayed by displays of known VR systems is at present not higher than 25 pixels per degree of angle of view, while human eye is capable of viewing an image with a resolution of 60 pixels per degree. Therefore, there is a need for increasing image resolution of images displayed by an optical device in the optical device applications in AR/VR systems.

An embodiment of the disclosure may provide an optical device for extending the OPL of an incident optical light.

The optical device may include one or more electroactive optical cells and an optical path extender. The electroactive optical cells and the optical path extender may extend the OPL of the optical light by changing a phase of the optical light while providing repeated transmission of the optical light in mutually opposite directions. Thereby, it is possible to display a virtual image at various focal lengths.

In another embodiment of the disclosure, the optical device may include a greater number of electroactive optical cells, semi-transparent mirrors, QWPs, and a PBS which are respectively arranged in order to provide for repeated transmission of optical light and suitably changing phases and/or polarization of optical light. Meanwhile, configuration of the one or more electroactive optical cells and/or a selective polarization element with respect to a direction of the incident optical light may vary according to a specific embodiment of the disclosure.

Some of the possible embodiments of the optical device and the principle of its operation will be described in more detail below. According to the disclosure, the at least one electroactive optical cell may be a tunable electroactive optical cell including an electroactive layer and an electrode pattern, wherein the electroactive layer may be configured to change the OPL by applying a respective voltage to the electrode pattern. In at least one of the embodiments of the disclosure, the selective polarization element may include at least two intersecting polarization selective mirrors, one of which may be configured to reflect an optical light with left-hand circular polarization (LHCP) and transmit an optical light with right-hand circular polarization (RHCP). The other one may be configured to transmit an optical light with LHCP and reflect an optical light with RHCP. In this case, the number of electroactive optical cells and/or semi-transparent mirrors may also be greater than one. The polarization selective mirror may be formed of, for example, a cholesteric crystal, but is not limited thereto.

The optical device 100 according to an embodiment of the disclosure may operate to extend the OPL of the incident light as follows.

In the embodiment of the disclosure, in a path of light in the direction of a user's eye, light with RHCP and light with LHCP pass through the semi-transparent mirror 122 and then pass through the QWP 124. The QWP 124 may convert RHCP into first linear polarization, e.g., p-polarization, and convert LHCP into second linear polarization, e.g., s-polarization.

Then, light with s-polarization passes through the electroactive optical cell 126, retains its polarization, and reaches the PBS 128. The light with s-polarization is reflected from the PBS 128 and returns to the electroactive optical cell 126. The light with s-polarization may pass through the electroactive optical cell 126 and be converted to LHCP through the QWP 124. LHCP may be partially reflected by the semi-transparent mirror 122 to be converted into RHCP.

RHCP may be converted into p-polarization by the QWP 124, then pass through the electroactive optical cell 126, and retain p-polarization. Then, p-polarization is transferred to the user's eye through the PBS 128.

As described above, the optical light is transmitted through the electroactive optical cell 126 at least three times (two times in a forward direction and one time in a reverse direction) in mutually reverse directions, thereby extending the OPL of the optical light. In this case, the PBS 128 is configured to transmit p-polarization and reflect s-polarization, and the semi-transparent mirror 122 partially transmits the incident optical light and at least partially reflects the optical light back to the optical device.

Accordingly, the optical device 100 may provide for repeated transmission of the optical light. The specific polarization states of the optical light transmitted and/or reflected by elements of the optical device are merely a model, and in other embodiments of the disclosure, the elements may transmit and/or reflect the optical light with different polarizations.

Figure 10:
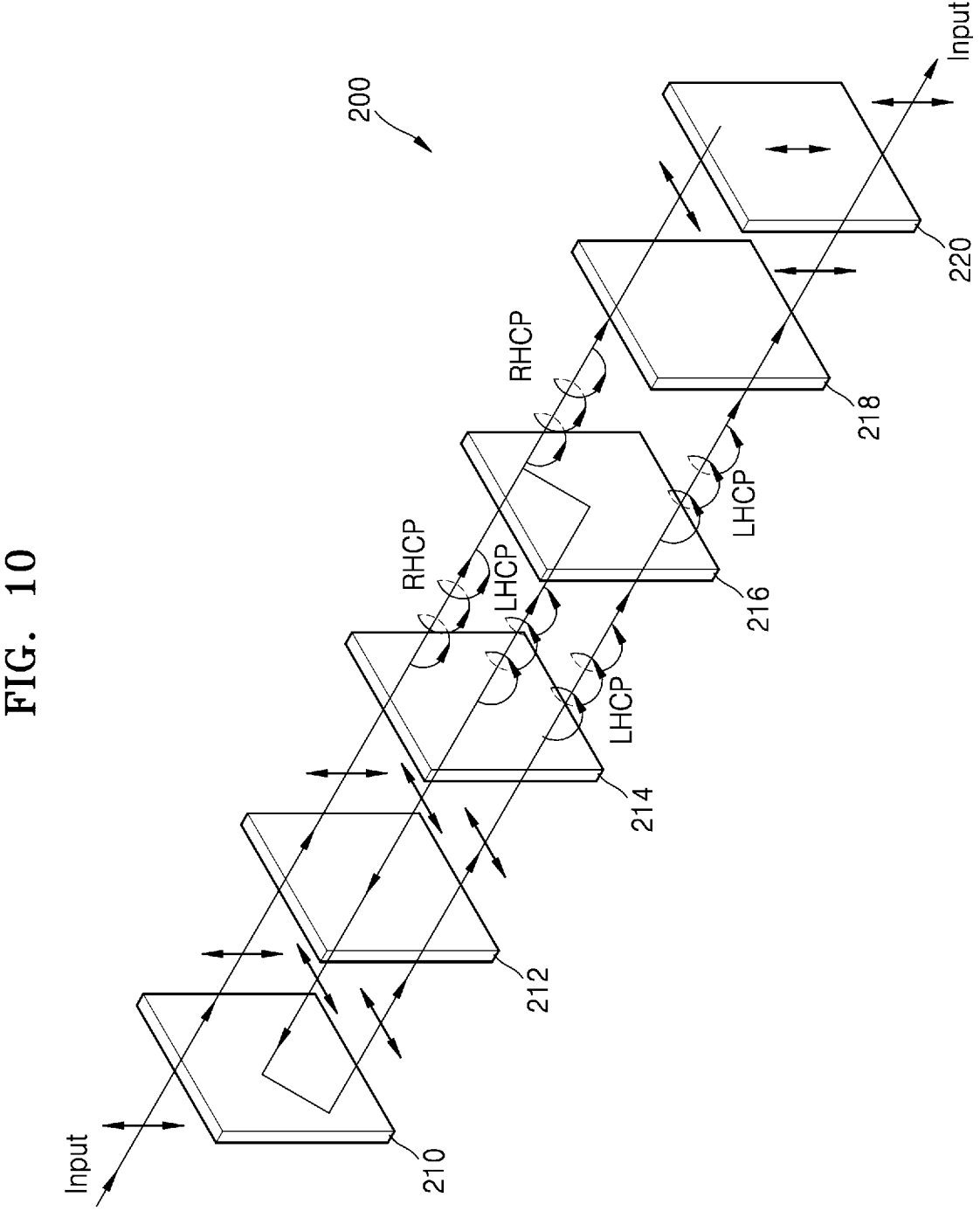
FIG. 10 schematically shows an optical device according to an embodiment of the disclosure.

FIG. 10 illustrates an optical device according to an embodiment of the disclosure.

Referring to FIG. 10, an optical device 200 may include a PBS 210, an electroactive optical cell 212, a first QWP 214 and a second QWP 218, and, a WGP 220.

A semi-transparent mirror 216 may be further provided between the first QWP 214 and the second QWP 218. In the embodiment of the disclosure, an arrangement of elements of the optical device is different from that of the embodiment of the disclosure shown in FIG. 9. In the embodiment of the disclosure, the PBS 210, the first QWP 214, the semi-transparent mirror 216, the second QWP 218, and the WGP 220 may constitute an optical path extender. Then, the PBS 210 may constitute the first element (C1 in FIG. 1) of the optical path extender, the first QWP 214, the semi-transparent mirror 216, and the second QWP 218, and the WGP 220 may constitute the second element (C2 in FIG. 1).

The optical device 200 operates as follows.

The PBS 210 may transmit light of first linear polarization, for example, p-polarization, and reflect light of second linear polarization, for example, s-polarization. Among the light incident to the PBS 210, only the light of p-polarization may be transmitted. The light of p-polarization passes through the electroactive optical cell 212 without changing a phase difference while retaining p-polarization. Then, the light of p-polarization passes through the first QWP 214. The light of p-polarization is converted into RHCP by the QWP 214, and RHCP is partially reflected and partially transmitted by the semi-transparent mirror 216. RHCP reflected from the semi-transparent mirror 216 may return to the first QWP 214 and be converted to s-polarization through the first QWP 214. S-polarization passes through the electroactive optical cell 212 as it is and is directed to the PBS 210. S-polarization is reflected from the PBS 210 and returns to the electroactive optical cell 212. When light of s-polarization passes through the electroactive optical cell 212, a phase difference defined by a phase profile of the electroactive optical cell is provided. And, when the light of s-polarization is reflected by the PBS and passes through the electroactive optical cell 212 again, the phase difference two times as compared to the incident optical light may be provided.

The light of s-polarization passes through the electroactive optical cell 212 as it is and enters the first QWP 214. The light of s-polarization is converted into LHCP by the QWP 214, passes through the semi-transparent mirror 216 and is incident on the second QWP 218. LHCP is converted into p-polarization by the second QWP 218 and is incident on the WGP 220. The light of p-polarization may be output through the WGP 220. The WGP 220 may transmit, for example, the light of p-polarization and absorb or reflect the light of s-polarization.

A selection of extent of absorption/reflection of the optical light by the WGP 220 may be stipulated by a need to block or, on the contrary, output the optical light having a desired polarization vector orientation.

Figure 11:
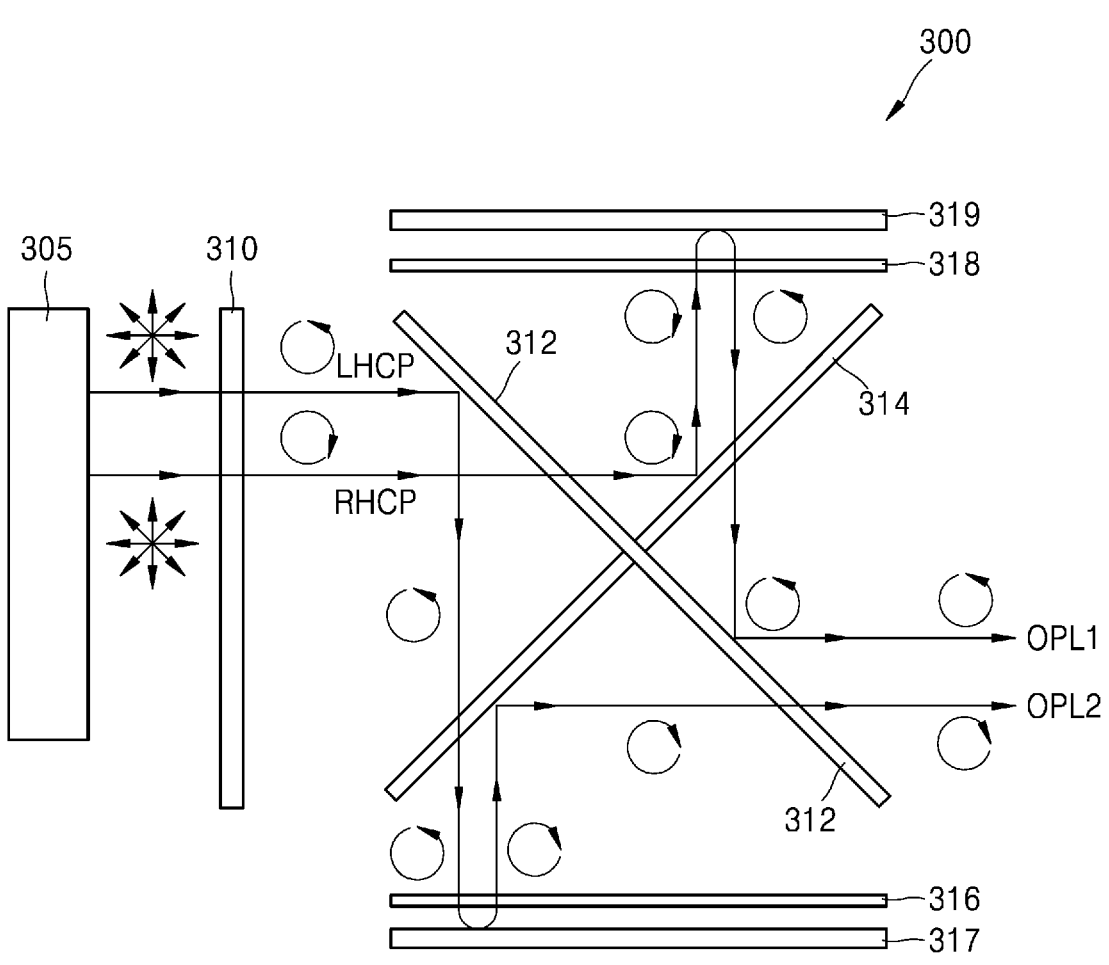
FIG. 11 schematically shows an optical device according to an embodiment of the disclosure.

FIG. 11 illustrates an optical device according to an embodiment of the disclosure.

Referring to FIG. 11, an optical device 300 may include a pixel level polarizer 310, a first polarization selective element 312, a second polarization selective element 314, a first electroactive optical cell 316, and a second electroactive optical cell 318.

The first polarization selective element 312 may be arranged to intersect the second polarization selective element 314. The first electroactive optical cell 316 and the second electroactive optical cell 318 may face each other and be arranged in parallel. The first polarization selective element 312 and the second polarization selective element 314 may be disposed between the first electroactive optical cell 316 and the second electroactive optical cell 318. A first mirror 317 may be provided adjacent to the first electroactive optical cell 316, and a second mirror 319 may be provided adjacent to the second electroactive optical cell 318.

In the embodiment of the disclosure, the optical path extender may include a first polarization selective element 312 and a second polarization selective element 314. The first polarization selective element 312 may include, for example, a left-hand polarized cholesteric crystal (LHCLC). The second polarization selective element 314 may include, for example, a right-hand polarized cholesteric crystal (RHCLC). In the embodiment of the disclosure, an optical light which is illustrated as a non-polarized optical light forming two different images formed by the display panel 305 may enter the optical device 300 through the pixel level polarizer 310, and the pixel level polarizer 310 may convert an incident light into RHCP and LHCP.

An operation of the optical device 300 will be described.

The pixel level polarizer 310 may change a polarization state as well as change the intensity of the optical light from each individual pixel of the display panel 305. The pixel level polarizer 310 may provide, for example, one of four possible polarization vector directions in a pixel level. The pixel level polarizer 310 may provide one of four possible polarization vector directions, for example, 0°, 45°, 90°, and 135°. This is achieved by providing a super-pixel among four regions according to the number of possible polarization vector directions, each of which may correspond to its own intensity modulation and optical light polarization.

The pixel level polarizer 310 may split the optical light from various images to focus beams of each of the optical light at different focal lengths so as to resolve the vergence-accommodation conflict (VAC). For example, see Brock, Neal, Bradley T. Kimbrough, and James E. Millerd "A pixelated micropolarizer-based camera for instantaneous interferometric measurements." Polarization Science and Remote Sensing V. Vol. 8160. International Society for Optics and Photonics, 2011.

Light emitted from a display panel 305 may be converted into light of LHCP and light of RHCP by the pixel level polarizer 310 in a pixel level.

The first polarization selective element 312 may reflect light of LHCP and transmit light of RHCP. The second polarization selective element 314 may transmit light of LHCP and reflect light of RHCP.

The light of RHCP from the pixel level polarizer 310 is transmitted through the first polarization selective element 312 and enters the second polarization selective element 314. The light of RHCP is reflected from the second polarization selective element 314 and is incident on the second electroactive optical cell 318. The light of RHCP may pass through the second electroactive optical cell 318 and be reflected by the second mirror 319 and converted into the light of LHCP. The light of LHCP passes through the second electroactive optical cell 318 and enters the second polarization selective element 314. In addition, the light of LHCP may be transmitted through the second polarization selective element 314 and reflected and output by the first polarization selective element 312. This constitutes the first optical path OPL1.

The light of LHCP from the pixel level polarizer 310 is reflected by the first polarization selective element 312 and enters the second polarization selective element 314. The light of LHCP passes through the second polarization selective element 314 and is incident on the first electroactive optical cell 316. The light of LHCP may pass through the first electroactive optical cell 316 and be reflected by the first mirror 317 and converted into the light of LHCP. The light of LHCP passes through the first electroactive optical cell 316 and enters the second polarization selective element 314. In addition, the light of LHCP may be reflected from the second polarization selective element 314 and may be output through the first polarization selective element 312. This constitutes the second optical path OPL2.

In the first optical path OPL1 and the second optical path OPL2, respectively, the light passes through the corresponding electroactive optical cell twice.

Figure 12:
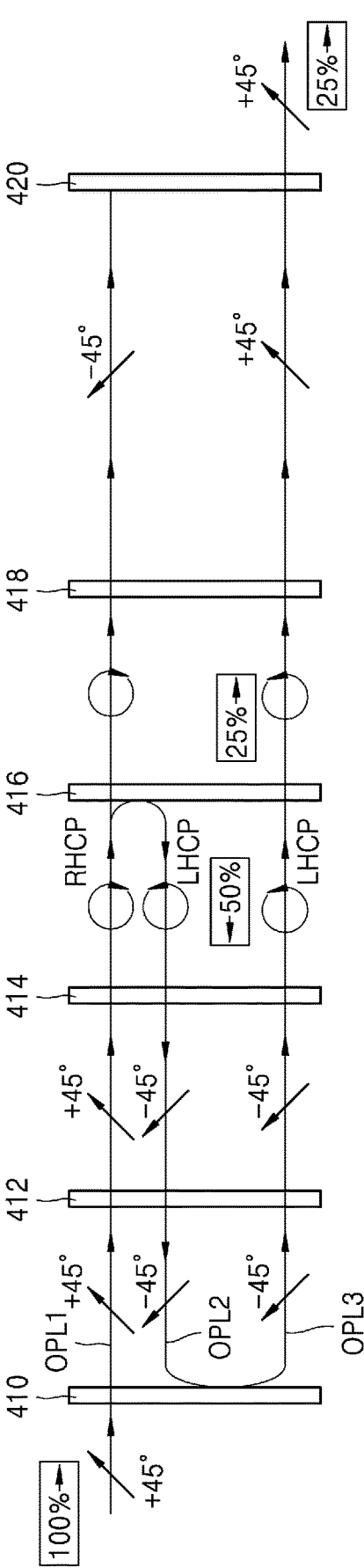
FIG. 12 schematically shows an optical device according to an embodiment of the disclosure.

FIG. 12 illustrates an optical device according to an embodiment of the disclosure.

Referring to FIG. 12, an optical device 400 may include a PBS 410, an electroactive optical cell 412, a first QWP 414, a semi-transparent mirror 416, a second QWP 418, and a WGP 420.

For example, the PBS 410 may transmit light of first linear polarization, e.g., polarization of (+)45 degree, and reflect light of second linear polarization, e.g., polarization of (−)45 degree. Among the light incident on the PBS 410, light of first linear polarization is transmitted, and light of first linear polarization is transmitted through the electroactive optical cell 412. The light of first linear polarization is converted into light of RHCP by the first QWP 414. The light of RHCP is partially transmitted through the semi-transparent mirror 416, and partially reflected from the semi-transparent mirror 416. The transmitted light of RHCP may be converted into the light of second linear polarization by the second QWP 418.

The WGP 420 may reflect or absorb and block the light of first linear polarization, and transmit the light of second linear polarization. Accordingly, the light of second linear polarization transmitted through the second QWP 418 may be blocked by the WGP 420.

When the light of RHCP is reflected by the semi-transparent mirror 416, the light of RHCP is converted into LHCP and enters the first QWP 414. Light of LHCP is converted into the light of second linear polarization by the first QWP

414, passes through the electroactive optical cell 412 and enters the PBS 410. The light of second linear polarization is reflected from the PBS 410 and enters the electroactive optical cell 412 again. The light of second linear polarization passing through the electroactive optical cell 412 is converted into light of LHCP through the first QWP 414. The left of LHCP partially passes through the semi-transparent mirror 416 and is converted to the light of first linear polarization by the second QWP 418. The light of first linear polarization may be output through the WGP 420. The light of first linear polarization enters a user's eye as an effective light.

Meanwhile, a ratio of light output through the WGP 420 to light incident on the PBS 410 will be described. Light loss due to a surrounding environment or each optical device will be ignored.

Light of 100% is incident on the PBS 410. And, when the transmittance of the semi-transparent mirror 416 is 50%, the light reflected from the semi-transparent mirror 416 is 50%. When the light reflected from the semi-transparent mirror 415 again passes through the semi-transparent mirror 416 through the first QWP 414, the electroactive optical cell 412, the PBS 410, etc., light of 25% is transmitted with respect to the first incident light. Thus, the light output through the WGP 420 is 25% of the first incident light.

A method of extending the OPL of an incident optical light in an optical device may be characterized as follows. The incident light is split into light having first polarization and light having second polarization by a polarization selective element. The polarization selective element may use, for example, a pixel level polarizer, a PBS, a WGP, a polarization selective mirror made of a cholesteric crystal or a material sensitive to a polarization state of the incident light.

Then, at least one of first polarization and second polarization may be changed to another polarization by the QWP. The light having first polarization and the light having second polarization are transmitted through at least one electroactive optical cell, and the light with the changed polarization is at least partially reflected by the PBS. The reflected light with the changed polarization is transmitted through an electroactive optical cell (the same one as mentioned above or another one depending on a given embodiment). The light is at least partially reflected by a semi-transparent mirror, and the light reflected by the semi-transparent mirror is again at least partially transmitted through the electroactive optical cell. The other part of the light is at least partially transmitted by the PBS.

The above-mentioned first polarization may be LHCP or RHCP, and the above-mentioned second polarization may be RHCP or LHCP. Further, the first polarization may be linear s-polarization or linear p-polarization, and the second polarization may be linear p-polarization or linear s-polarization. In addition, the first polarization may be polarization of (+)45 degree or polarization of (−)45 degree, and the second polarization may be polarization of (+)45 degree or polarization of (−)45 degree.

An operation of transmitting the reflected light with the changed polarization through the electroactive optical cell may include providing light with a first phase difference. The operation may selectively include transmitting the light reflected by the semi-transparent mirror through the electroactive optical cell. The operation may include providing light with a second phase difference different from the first phase difference. However, the phase difference may be zero, for example, when light with polarization that is not influenced by the electroactive optical cell is transmitted and reflected.

In the embodiment of the disclosure of FIG. 12, the electroactive optical cell 412 may be active with respect to light with a polarization vector direction of (–)45°, and may be passive with respect to light with a polarization vector direction of (+)45°. In the embodiment of the disclosure, the light with the polarization vector direction of (–)45° may pass through the electroactive optical cell 412 twice and be provided with twice a phase defined by a phase profile of the electroactive optical cell 412. In the embodiment of the disclosure, RHCP after the semi-transparent mirror 416 may be provided with the polarization vector direction of (–)45° after the second QWP 418.

Reference numerals OPL1, OPL2, and OPL3 in FIG. 12 denote segments of length of a resulting optical path, where the total optical path is a sum of the lengths of these segments (OPL=OPL1+OPL2+OPL3). As may be seen from FIG. 12, efficiency at the output of the optical device is 25% compared to the initial 100%.

Figure 13:
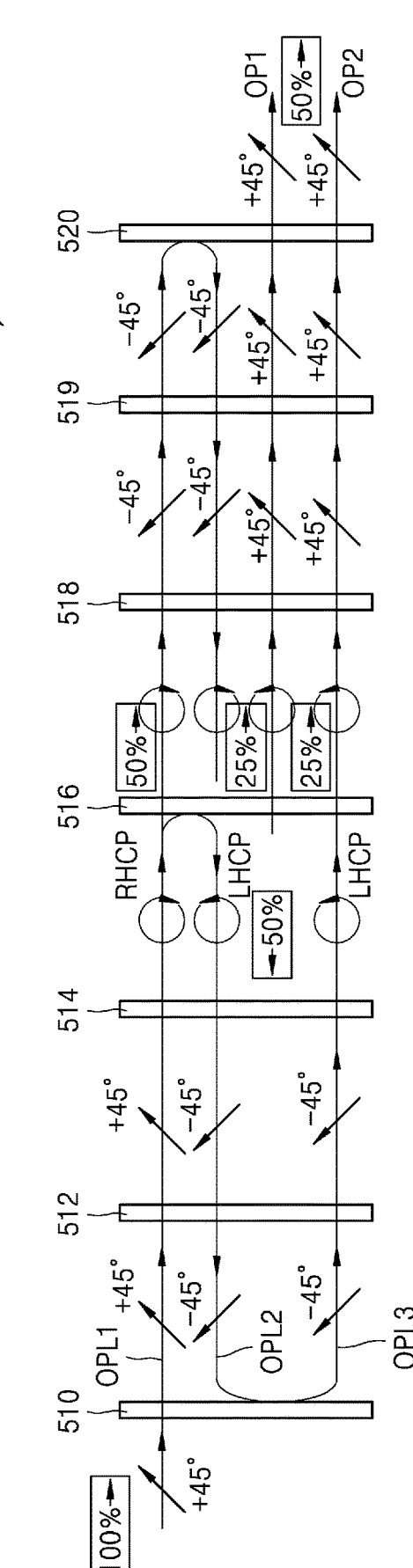
FIG. 13 schematically shows an optical device according to an embodiment of the disclosure.

FIG. 13 illustrates an optical device according to an embodiment of the disclosure.

Referring to FIG. 13, an optical device 500 may include a first PBS 510, a first electroactive optical cell 512, a first QWP 514, a semi-transparent mirror 516, a second QWP 518, a second electroactive optical cell 519, and a second PBS 520.

For example, the first PBS 510 and the second PBS 520 may transmit light of first linear polarization and reflect light of second linear polarization. The first linear polarization may have, for example, a polarization vector direction of (+)45°, and the second linear polarization may have, for example, a polarization vector direction of (–)45°.

Among the light incident on the first PBS 510, light of the first linear polarization is transmitted, and light of the first linear polarization is transmitted through the first electroactive optical cell 512. The light of the first linear polarization is converted into light of RHCP by the first QWP 514. The light of RHCP is partially transmitted through the semi-transparent mirror 416, and is partially reflected from the semi-transparent mirror 416.

The transmitted light of RHCP may be converted into light of second linear polarization by the second QWP 418. Then, the light of second linear polarization passes through the second electroactive optical cell 519 and is incident on the second PBS 520.

The light of second linear polarization passing through the second electroactive optical cell 519 is reflected by the second PBS 520 and returns to the second electroactive optical cell 519. The light of second linear polarization passing through the second electroactive optical cell 519 may be converted into the light of RHCP by the second QWP 518. The light of RHCP may be partially reflected by the semi-transparent mirror 516 and pass through the second QWP 518 to be converted into the light of the first linear polarization. The light of the first linear polarization passes through the second electroactive optical cell 519 and is incident on the second PBS 520. The light of the first linear polarization may be output through the second PBS 520. The optical path described herein is referred to as a first optical path OP1.

Next, a path of light reflected from the semi-transparent mirror 516 will be described. When the light of RHCP is reflected by the semi-transparent mirror 516, the light of RHCP is converted into light of LHCP and enters the first QWP 514. The light of LHCP is converted into light of second linear polarization by the first QWP 514, passes through the first electroactive optical cell 512 and enters the first PBS 510. The light of second linear polarization is reflected from the first PBS 510 and enters the first electroactive optical cell 512 again. The light of second linear polarization passing through the first electroactive optical cell 512 is converted into the light of LHCP through the first QWP 514. The light of LHCP partially passes through the semi-transparent mirror 516 and is converted into light of first linear polarization by the second QWP 518. The light of first linear polarization may pass through the second electroactive optical cell 519 and output through the second PBS 520. The optical path described herein is referred to as a second optical path OP2.

In the embodiment of the disclosure, the light of first linear polarization among the light passing through the semi-transparent mirror 516 and the light reflected by the semi-transparent mirror 516 enters the user's eyes as an effective light.

Meanwhile, a ratio of light output through the second PBS 520 to the total light incident on the first PBS 510 will be described. Light loss due to the surrounding environment or each optical device will be ignored.

Light of 100% is incident on the first PBS 510. And, when the transmittance of the semi-transparent mirror 516 is 50%, the light transmitted through the semi-transparent mirror 516 is 50%. Then, the light reflected from the semi-transparent mirror 516 via the second QWP 518, the second electroactive optical cell 519, the second PBS 520, etc. is 25% This light is output through the second PBS 520. Accordingly, the light of the first optical path OP1 output through the second PBS 520 is 25%.

Next, the light reflected from the semi-transparent mirror 515 is 50%. When the reflected light passes through the semi-transparent mirror 516 again via the first QWP 514, the first electroactive optical cell 512, the first PBS 510, etc., light of 25% is transmitted. Accordingly, the light of the second optical path OP2 output through the second PBS 520 is 25%.

Accordingly, in the embodiment of the disclosure, the total light of 50% may be output with respect to the first incident light.

Figure 14:
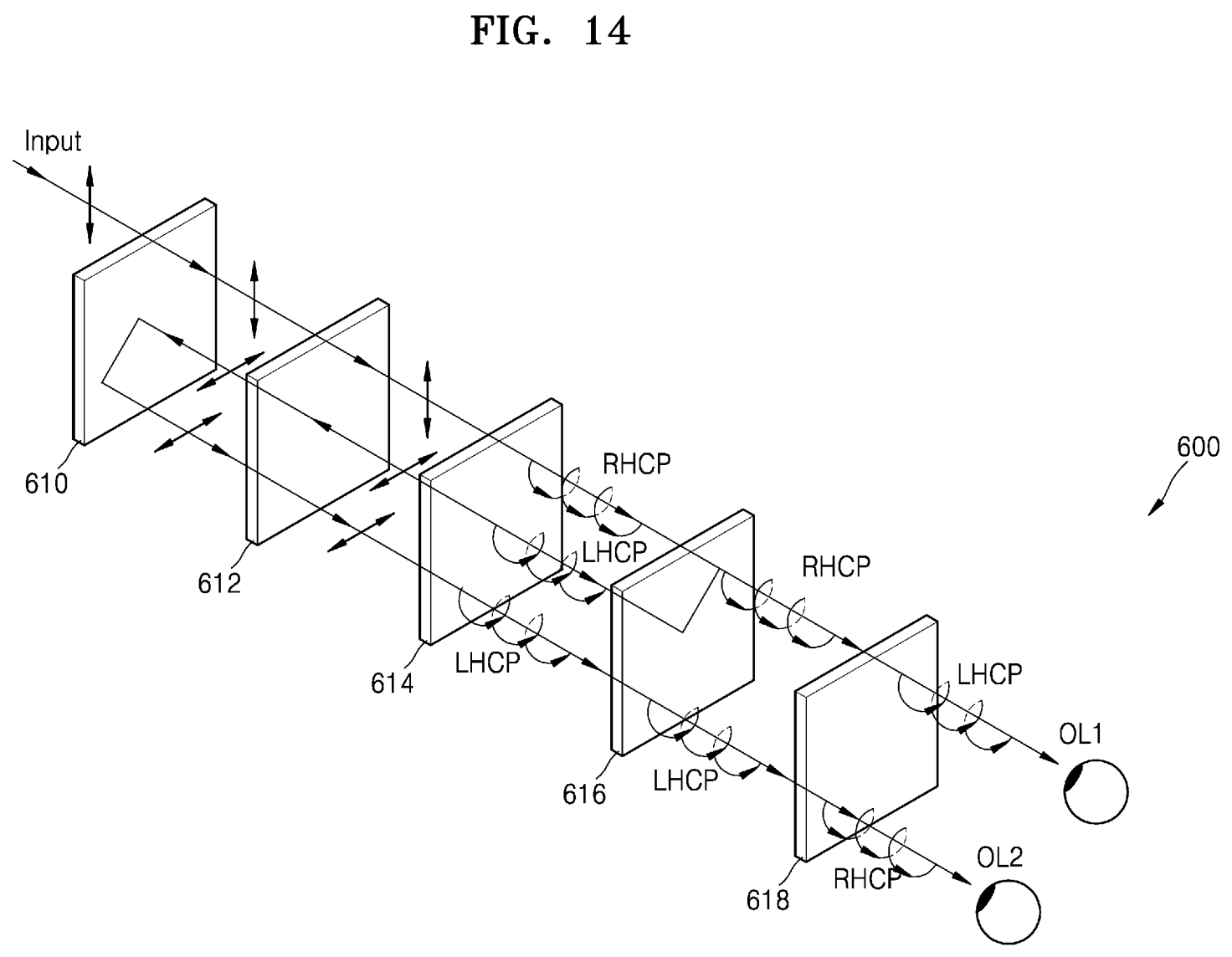

In FIG. 14, reference numerals OPL1, OPL2, and OPL3 denote segments of the length of the second optical path OP2, and reference numerals OPL4, OPL5 and OPL6 denote segments of the length of the first optical path OP1. The total length of the first optical path OP1 is (OPL4+OPL5+OPL6), and the total length of the second optical path OP2 is (OPL1+OPL2+OPL3).

In the embodiment of the disclosure of FIG. 13, compared with the embodiment of the disclosure of FIG. 12, the second electroactive optical cell 519 is added, and the output of the optical device may be increased to an efficiency of 50%.

FIG. 14 illustrates an optical device according to an embodiment of the disclosure.

Referring to FIG. 14, an optical device 600 may include a PBS 610, an electroactive optical cell 612, a QWP 614, a semi-transparent mirror 616, and a geometric phase lens (GPL) 618.

In the embodiment of the disclosure, the PBS 610, the QWP 614, the semi-transparent mirror 416, and the GPL 618 may constitute an optical path extender.

The optical device 600 operates as follows.

The PBS 610 may transmit light of first linear polarization, for example, p-polarization, and reflect light of second linear polarization, for example, s-polarization. Of the light incident to the PBS 610, only the light of p-polarization may be transmitted. The light of P-polarization passes through the electroactive optical cell 612 while retaining p-polarization. Then, the light of p-polarization passes through the QWP 614. The light of p-polarization is converted into RHCP by the QWP 614, and RHCP is partially reflected and partially transmitted by the semi-transparent mirror 616.

Light of RHCP partially passes through the semi-transparent mirror 616, and then enters the GPL 618.

The GPL 618 converts RHCP into LHCP, and in this case, the GPL 618 may operate as a convex lens. In addition, the GPL 618 may convert LHCP into RHCP, and in this case, the GPL 618 may operate as a concave lens. As described above, the GPL 618 may operate as a convex lens or a concave lens depending on a polarization state of an incident light. In other words, the GPL 618 may operate as a lens that focuses or diverges light depending on the polarization state of the incident light.

Accordingly, light of RHCP is converted into left LHCP by the GPL 618, and light of LHCP may be focused. A path of the light traveling as described above is referred to as the first optical path OL1.

Meanwhile, light reflected from the semi-transparent mirror 616 will be described. When RHCP is reflected from semi-transparent mirror 616, RHCP is converted into LHCP and returns to the QWP 614. LHCP may be converted into s-polarization through the QWP 614. S-polarization passes through the electroactive optical cell 612 as it is and is directed to the PBS 610. S-polarization is reflected from the PBS 610 and returns to the electroactive optical cell 612.

When light of s-polarization passes through the electroactive optical cell 612, a phase difference defined by a phase profile of the electroactive optical cell may be provided. And, when light of s-polarization is reflected by the PBS 610 and passes through the electroactive optical cell 612 again, a phase difference may be provided.

The light of s-polarization passes through the electroactive optical cell 612 as it is and enters the QWP 614. The light of s-polarization is converted into LHCP by the QWP 614, passes through the semi-transparent mirror 616 and is incident on the GPL 618.

When light of LHCP passes through the GPL 618, the light of LHCP may be converted into light of RHCP and diverged. A path of the light described above is referred to as the second optical path OL2.

In the embodiment of the disclosure, two images having different magnifications may be provided. Light via the first optical path OL1 may provide a reduced image, and light via the second optical path OL2 may provide an enlarged image. In this case, when the user's left eye and right eye have different visions, for example, different myopia, an image suitable for the vision of user's left and right eyes may be provided.

In addition, in the second optical path OL2, the light passes through the electroactive optical cell 612 three times, thereby increasing the OPL. Therefore, by increasing the OPL with respect to the electroactive optical cells 612 of the same thickness, optical performance such as optical power control and focal length control may be improved while retaining or increasing a reaction rate of the electroactive optical cell.

Figure 15:
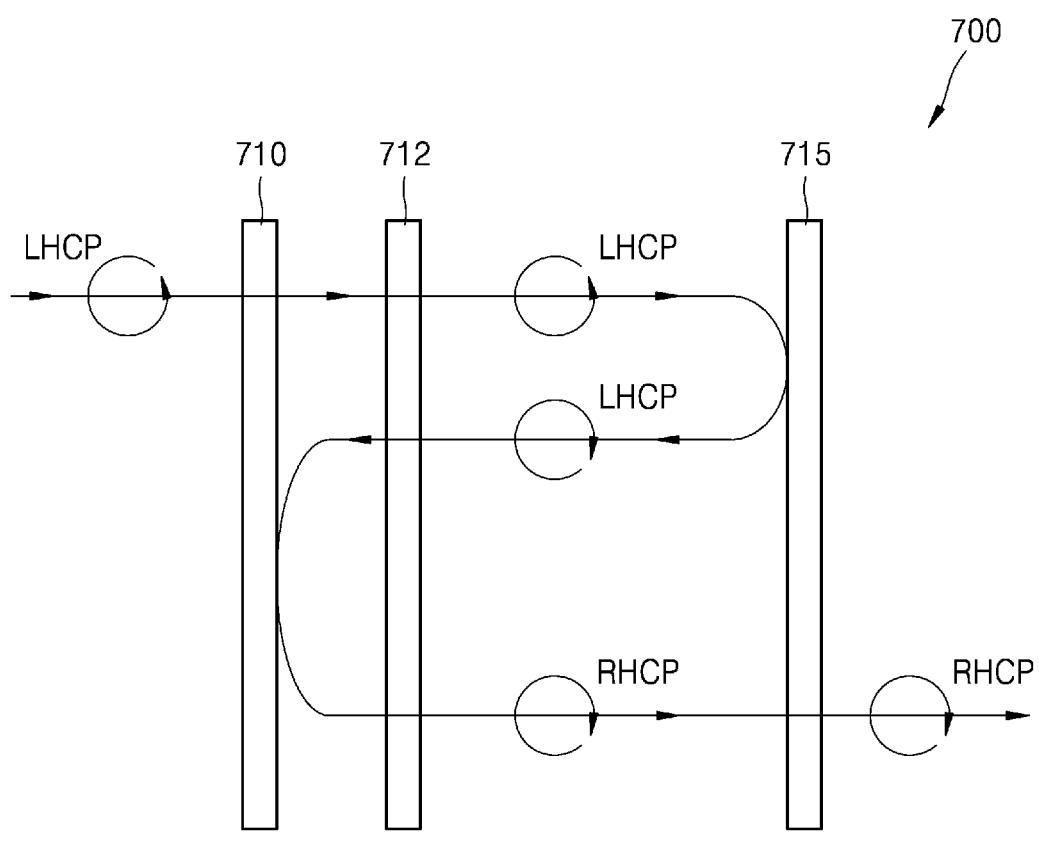
FIG. 15 schematically shows an optical device according to an embodiment of the disclosure.

FIG. 15 illustrates an optical device according to an embodiment of the disclosure.

Referring to FIG. 15, an optical device 700 may include a semi-transparent mirror 710, an electroactive optical cell 712, and a polarization selective element 715.

For example, light of LHCP may be incident on the semi-transparent mirror 710. The light of LHCP passes through the electroactive optical cell 712 and enters the polarization selective element 715. The polarization selective element 715 may be, for example, a circular polarization selective mirror. The polarization selective element 715 may reflect, for example, the light of LHCP and transmit light of RHCP. Accordingly, the light of LHCP is reflected from the polarization selective element 715 and enters the electroactive optical cell 712. The light of LHCP passing through the electroactive optical cell 712 is partially reflected by the semi-transparent mirror 710 and returns to the electroactive optical cell 712. The light of LHCP passing through the electroactive optical cell 712 may pass through the polarization selective element 715 to be output.

In the embodiment of the disclosure, the semi-transparent mirror 710 and the polarization selective element 715 may constitute an optical path extender. Accordingly, in the embodiment of the disclosure, the optical path extender may be configured simply. The light passes through the electroactive optical cell 712 three times, and thus the OPL may be extended.

Figure 16:
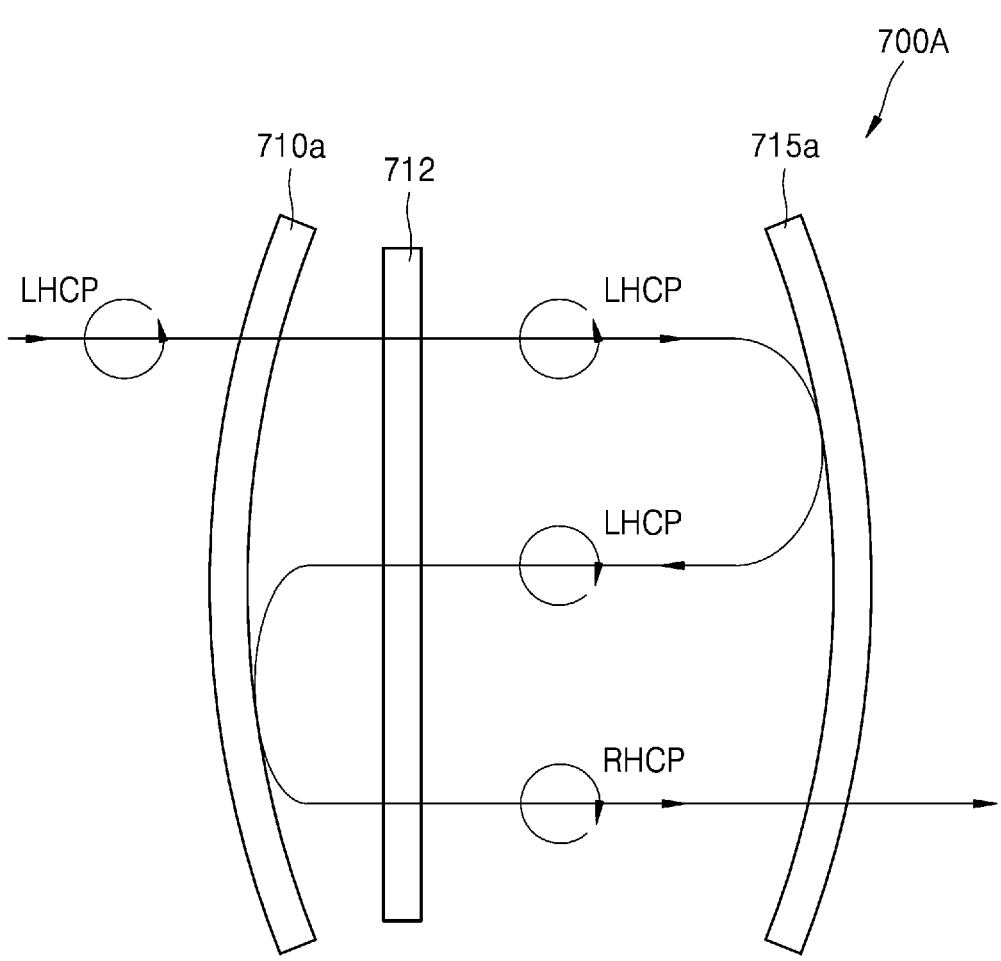
FIG. 16 is a modified example of the optical device shown in FIG. 15 according to an embodiment of the disclosure.

FIG. 16 is a modified example of an optical device shown in FIG. 15 according to an embodiment of the disclosure.

Referring to FIG. 16, an optical device 700A may include a semi-transparent mirror 710a, the electroactive optical cell 712, and a polarization selective element 715a.

An optical operation of the optical device 700A is similar to that of the optical device 700 shown in FIG. 15, and thus a detailed description thereof will be omitted.

At least one of the semi-transparent mirror 710a and the polarization selective element 715a may be configured in a curved shape. For example, the semi-transparent mirror 710a may have a curved shape concave toward the electroactive optical cell 712. For example, the polarization selective element 715a may have a curved shape concave toward the electroactive optical cell 712. However, the semi-transparent mirror 710a and the polarization selective element 715a may each have a concave shape in a direction opposite to that shown in FIG. 16.

When the semi-transparent mirror 710a or the polarization selective element 715a is configured in the curved shape, the semi-transparent mirror 710a or the polarization selective element 715a may have optical power. Thus, the optical power of the semi-transparent mirror 710a and the polarization selective element 715a may be synthesized into the tunable optical power by the electroactive optical cell 712. Alternatively, an optical aberration may be corrected by configuring at least one of the semi-transparent mirror 710a and the polarization selective element 715a in the curved shape.

In some embodiments of the disclosure, the optical path extender may further include a WGP configured to transmit an optical light of one polarization type and reflect or absorb an optical light of another polarization type. In some embodiments of the disclosure, the optical device 700A may further include a GPL configured to focus the optical light to different polarizations at different focal lengths. Further, in some embodiments of the disclosure, a selective polarizer element may include an element such as a semi-transparent mirror and/or at least one polarization selective mirror having a curvature, which may add a constant phase profile to the tunable phase profile of one or more variable electroactive cells.

Meanwhile, in an AR or VR system, the optical device according to an embodiment of the disclosure may be implemented as a so-called optical wedge.

That is, an electroactive optical cell may act as an optical wedge to increase the resolution of the image displayed by the optical device. In this case, the constant phase profile may enable optical power offset or aberration correction and/or optical wedge angle offset of the at least one tunable electroactive cell.

Figure 17:
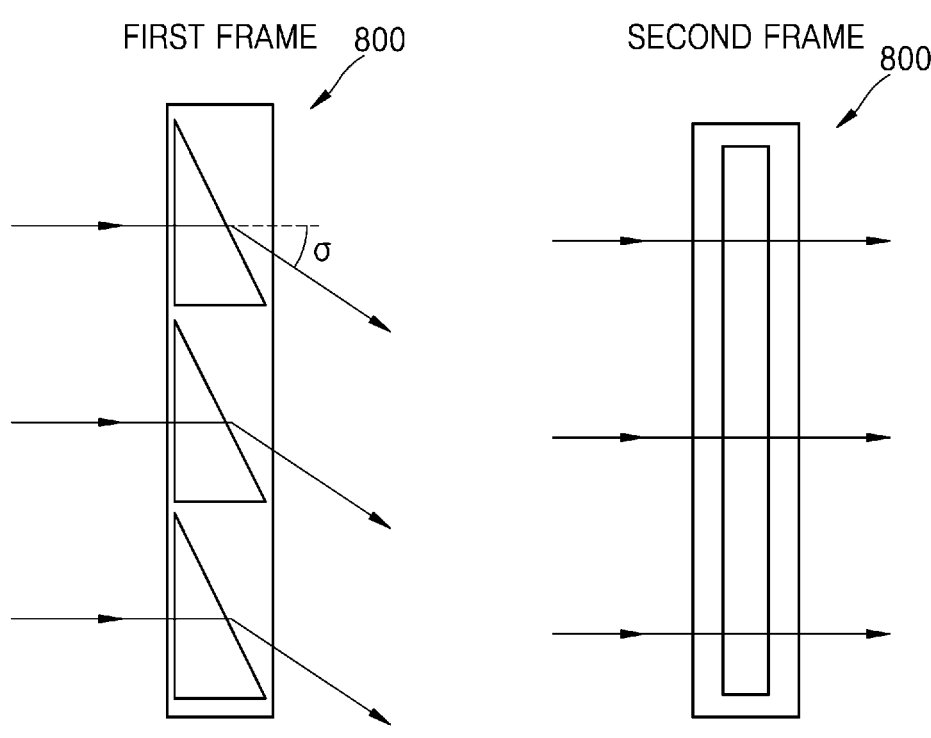
FIG. 17 is a diagram illustrating an operation of an optical device operating according to an embodiment of the disclosure.

FIG. 17 illustrates an electroactive optical cell of an optical device operating as an optical wedge according to an embodiment of the disclosure.

Referring to FIG. 17, an electroactive optical cell 800 may form a phase profile of a prism structure by a voltage applied to an electrode. The phase profile of the prismatic structure may diffract a light beam. The electroactive optical cell 800 may generate a first frame in which incident light is diffracted with a diffraction angle σ, and a second frame in which light is transmitted in a straight line. An image is not shifted through diffraction of the light beam.

Figure 18:
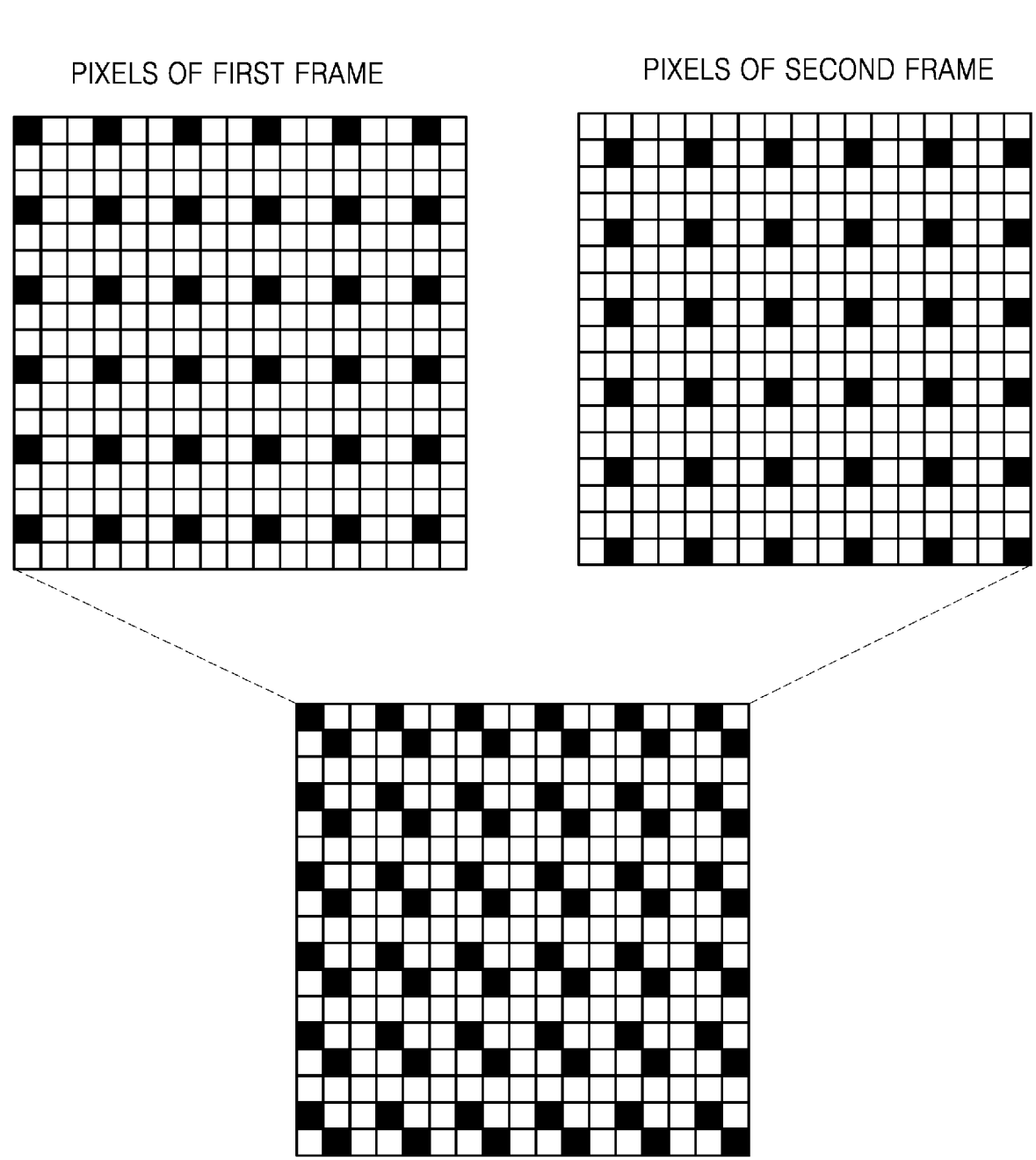
FIG. 18 is a diagram illustrating an effect of increasing the resolution according to the operation of the optical device shown in FIG. 17 according to an embodiment of the disclosure.

FIG. 18 illustrates pixels of a first frame and pixels of a second frame according to an embodiment of the disclosure.

Referring to FIG. 18, the pixels of the first frame and the pixels of the second frame may overlap to show an image to a user. Fast switching (e.g., at a frequency higher than 50 Hz) of the first and second frames overlapped with each other may be perceived by a human eye as an image with doubled resolution.

Figure 19:
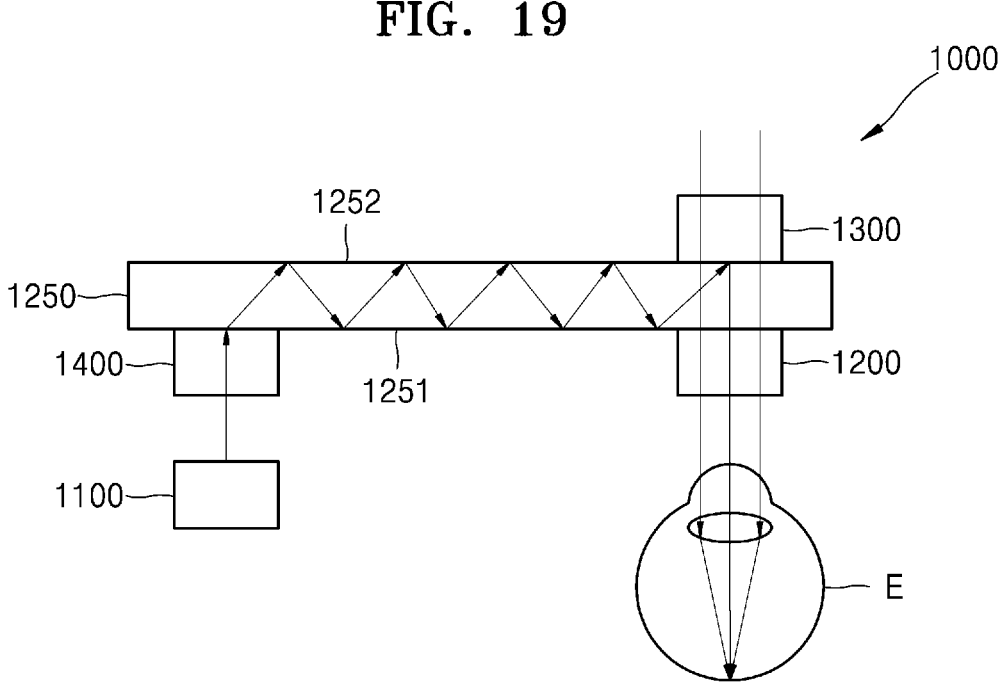
FIG. 19 schematically illustrates a display apparatus including an optical device according to an embodiment of the disclosure.

FIG. 19 illustrates a display apparatus according to an embodiment of the disclosure.

Referring to FIG. 19, a display apparatus 1000 includes a display panel 1100 that provides an image and at least one optical device that adjusts a phase profile of light from the display panel 1100.

The display panel 1100 may include, for example, a liquid crystal display (LCD), an organic LED (OLED), an inorganic LED (ILED), an active matrix having an organic light emitting diode (AMOLED), a transparent OLED (TOLED), or a quantum dot display (QOLED, QLED), etc. However, the display panel is not limited thereto.

The at least one optical device may include, for example, a first optical device 1200, a second optical device 1300, and a third optical device 1400. One of the optical devices described with reference to FIGS. 1 to 18 may be employed as the first to third optical devices 1200, 1300, and 1400.

The display apparatus 1000 may further include a waveguide 1250. The waveguide 1250 may include a first surface 1251 and a second surface 1252 facing the first surface 1251.

The first optical device 1200 may be provided on one side of the first surface 1251 of the waveguide 1250, and the second optical device 1200 may be provided on the other side of the second surface 1252 of the waveguide 1250. The third optical device 1400 may be disposed to face the second optical device 1200 on the first surface 1251 of the waveguide 1250.

The first optical device 1200 may be disposed between the display panel 1100 and the waveguide 1250. The first optical device 1200 may adjust the optical power (focal length) so that the image from the display panel 1100 is well focused on user's eyes. The second optical device 1200 may adjust the optical power so that a real object from the outside may be easily viewed.

The third optical device 1400 may, for example, adjust the optical power to supplement a user's vision. In the embodiment of the disclosure, the third optical device 1400 may be optional as needed.

The at least one optical device may be variously disposed on a path of an optical light from the display panel connected by the waveguide, to display a virtual image superimposed on the real world image in an AR system. In addition, in the display apparatus, a VAC may be removed, and a refraction error of the user's eye may be corrected.

Figure 20:
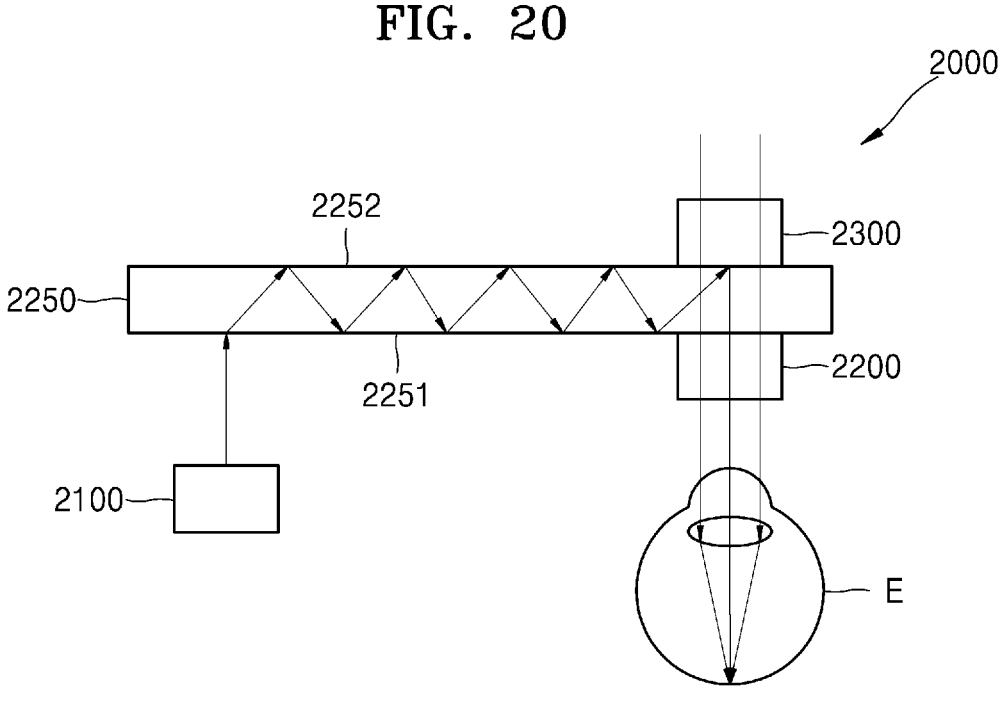
FIG. 20 schematically illustrates a display apparatus including an optical device according to an embodiment of the disclosure.

FIG. 20 illustrates a display apparatus according to an embodiment of the disclosure.

Referring to FIG. 20, a display apparatus 2000 includes a display panel 2100 that provides an image and at least one optical device that adjusts a phase profile of light from the display panel 2100.

The at least one optical device may include, for example, a first optical device 2200 and a second optical device 2300. One of the optical devices described with reference to FIGS. 1 to 18 may be employed as the first and second optical devices 2200 and 2300.

The display apparatus 2000 may further include a waveguide 2250. The waveguide 2250 may include a first surface 2251 and a second surface 2252 facing the first surface 2251.

The first optical device 2200 may be provided on the first surface 2251 of the waveguide 2250, and the second optical device 2200 may be provided on the second surface 2252 of the waveguide 2250. The first optical device 2200 and the second optical device 2300 may be disposed to face each other with the waveguide 2250 interposed therebetween.

Light emitted from the display panel 2100 is transferred through the waveguide 2250 and enters the first optical device 2200. The first optical device 2200 may adjust the optical power (focal length) so that an image from the display panel 2100 is well focused on user's eyes. The second optical device 2300 may adjust the optical power so that a real object from the outside may be easily viewed. For example, the first optical device 2200 may be configured to have a first optical power D1 so that the light from the display panel 2100 is focused on the user's eyes. The second optical device 2300 may be configured to have a second optical power −D1 having the same magnitude as and an opposite sign to that of the first optical power D1. In this case, when a user sees the real object from the outside, the user may feel as if the user sees the real object with the naked eye without the first optical device 2200 and the second optical device 2300.

The display apparatuses 1000 and 2000 according to an embodiment of the disclosure may be applied to, for example, a VR apparatus, an AR apparatus, a heads-up display, a head mounted display, etc.

According to an embodiment of the disclosure, in addition to shifting the image so as to increase resolution of the image displayed to the user, a multichannel may be provided by using a selective polarization structure and transmission/reflection of light with different phases and/or different polarizations.

In addition, an image of a different object may be located at a different depth along the optical axis and may substantially shift in a direction of the optical axis to be closer to or further away from the user's eyes. This may resolve the VAC, correct refractive errors in the user's eyes with vison disorders, and display an image to the user.

An optical device according to an embodiment of the disclosure may adjust a focal length and extend an OPL. In addition, the optical device according to the embodiment of the disclosure may be applied to an AR/VR system, tunable focus glasses for vision correction, lenses for photo and video cameras, etc. An optical device according to an embodiment of the disclosure may change a location of a virtual image by changing a focal length or by increasing the resolution of an AR/VR device, and may be used for users with vision disorders such as myopia, presbyopia, hyperopia, etc.

When the display apparatus according to an embodiment of the disclosure is used in an AR system, an apparent position of an image of a virtual object overlapping each object in the real world may be changed. When driving a vehicle using an AR system application, for example, AR goggles or a head-up display (HUD), this may be advantageously used to improve vision in limited visibility conditions (in particular, at night, in fog, in a "blindspot"), as well as to provide a user with additional information. The additional information may include, for example, navigation information, vehicle movement characteristics, obstacle warnings, etc.

Depending on the application of the display apparatus according to the embodiment of the disclosure, one or more optical devices may be used, which may include one or more electroactive optical cells and the optical path extender described above. The electroactive optical cells may have a plurality of stack structures, which may increase the diameter and/or thickness and maximum optical power and/or image shift angle of the optical device, etc., depending on the application of a given optical device.

For example, when the optical device according to various embodiments is used in a VR system, the resolution of an image displayed to a user of the VR system may be increased. Compared to the case wherein there is no optical device according to the embodiment of the disclosure, the OPL may be extended, for example, 3 times. This may enable increasing a response rate of the optical device 9 times and reducing the thickness 3 times. Persons skilled in the art shall understand that only some of the possible examples of techniques and material and technical means by which embodiments of the disclosure may be implemented are described above and shown in the figures Detailed description of embodiments of the disclosure as provided above is not intended for limiting or defining the scope of legal protection of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An optical device comprising:

at least one electroactive optical cell configured to adjust a phase profile of light; and an optical path extender configured to extend a path of light by allowing light to transmit through the at least one electroactive optical cell in opposite directions a plurality of times, wherein the at least one electroactive optical cell comprises:

a first electrode layer comprising a plurality of electrodes arranged apart from each other; and a second electrode layer facing the first electrode layer, and wherein the optical device is configured to provide independent voltage levels to the plurality of electrodes of the first electrode layer to adjust the phase profile of light such that the light is split into a plurality of lights having different phase profiles and the plurality of lights are focused at different focal lengths.

2. The optical device of claim 1, wherein the optical path extender comprises at least one of a semi-transparent mirror, a quarter-wave plate (QWP), or a polarization selective element.

3. The optical device of claim 2, wherein the optical path extender comprises the polarization selective element, and wherein the polarization selective element comprises at least one of a polarizing beam splitter (PBS), a wire grid polarizer (WGP), a cholesteric crystal, a circular polarization selective mirror, or a geometric phase lens (GPL).

4. The optical device of claim 1, wherein the at least one electroactive optical cell further comprises an electroactive layer between the first electrode layer and the second electrode layer, and wherein the electroactive layer is configured to change the phase profile of light based on the independent voltage levels applied to each of the plurality of electrodes of the first electrode layer and a voltage applied to the second electrode layer.

5. The optical device of claim 2, wherein the optical path extender comprises the polarization selective element, and wherein the polarization selective element comprises a first polarization selective element and a second polarization selective element arranged to intersect each other.

6. The optical device of claim 5, wherein the first polarization selective element is configured to reflect light of left-hand circular polarization (LHCP) and transmit light of right-hand circular polarization (RHCP), and wherein the second polarization selective element is configured to transmit the light of LHCP and reflect the light of RHCP.

7. The optical device of claim 1, wherein the optical path extender comprises a semi-transparent mirror disposed in front of the at least one electroactive optical cell, and a quarter-wave plate (QWP), and a polarizing beam splitter (PBS) disposed behind the at least one electroactive optical cell on the path of light.

8. The optical device of claim 1, wherein the optical path extender comprises a polarizing beam splitter (PBS) disposed in front of the at least one electroactive optical cell, a first quarter-wave plate (QWP), a semi-transparent mirror, a second QWP, and a wire grid polarizer (WGP) disposed behind the at least one electroactive optical cell on the path of light.

9. The optical device of claim 1, wherein the optical path extender is configured to allow light to pass through the at least one electroactive optical cell at least three times.

10. The optical device of claim 1, wherein the at least one electroactive optical cell comprises a first electroactive optical cell and a second electroactive optical cell, and wherein the optical path extender comprises a first polarizing beam splitter (PBS) disposed in front of the first electroactive optical cell, a first quarter-wave plate (QWP) disposed between the first electroactive optical cell and the second electroactive optical cell, a semi-transparent mirror, a second QWP, and a wire grid polarizer (WGP) disposed behind the second electroactive optical cell on the path of light.

11. A display apparatus comprising:

a display panel configured to form an image; and an optical device configured to adjust a phase profile of light emitted from the display panel, wherein the optical device comprises:

at least one electroactive optical cell; and an optical path extender to extend a path of light by allowing light to transmit through the at least one electroactive optical cell in opposite directions a plurality of times,

wherein the at least one electroactive optical cell comprises:

a first electrode layer comprising a plurality of electrodes arranged apart from each other; and a second electrode layer facing the first electrode layer, and wherein the optical device is configured to provide independent voltage levels to the plurality of electrodes of the first electrode layer to adjust the phase profile of light such that the light is split into a plurality of lights having different phase profiles and the plurality of lights are focused at different focal lengths.

12. The display apparatus of claim 11, wherein the optical path extender comprises at least one of a semi-transparent mirror, a quarter-wave plate (QWP), or a polarization selective element.

13. The display apparatus of claim 12, wherein the optical path extender comprises the polarization selective element, and wherein the polarization selective element comprises at least one of a polarizing beam splitter (PBS), a wire grid polarizer (WGP), a cholesteric crystal, a circular polarization selective mirror, or a geometric phase lens (GPL).

14. The display apparatus of claim 11, further comprising: a waveguide configured to transfer the light from the display panel.

15. A method, performed by an optical device, of extending an optical path length (OPL) of incident light, the method comprising:

splitting incident light into light of a first polarization and light of a second polarization;

24 converting, by a quarter-wave plate (QWP), a polarization of an optical light by using at least one of the first polarization or the second polarization;

controlling independent voltage levels of each of a plurality of electrodes of an electrode layer of an electroactive optical cell of the optical device to adjust a phase profile of light of the electroactive optical cell;

transmitting the light of the first polarization and the light of the second polarization through the electroactive optical cell;

at least partially reflecting, by a polarizing beam splitter (PBS), light of the converted polarization;

transmitting the light of the converted polarization through the electroactive optical cell;

at least partially reflecting the light by a semi-transparent mirror; and transmitting the light reflected by the semi-transparent mirror through the electroactive optical cell such that the light is split into a plurality of lights having different phase profiles and the plurality of lights are focused at different focal lengths.

16. The display apparatus of claim 11, wherein the at electroactive optical cell further comprises an electroactive layer, and wherein the electroactive layer is configured to change the phase profile of light based on the independent voltage levels applied to each of the plurality of electrodes of the first electrode layer and a voltage applied to the second electrode layer.

* * * * *